United States Patent
Eckel et al.

(10) Patent No.: US 12,208,490 B2
(45) Date of Patent: Jan. 28, 2025

(54) COATED ABRASIVE ARTICLE HAVING SPACER PARTICLES, MAKING METHOD AND APPARATUS THEREFOR

(71) Applicant: 3M INNOVATIVE PROPERTIES COMPANY, St. Paul, MN (US)

(72) Inventors: Joseph B. Eckel, Vadnais Heights, MN (US); Aaron K. Nienaber, Lake Elmo, MN (US); Thomas J. Nelson, Woodbury, MN (US); Ann M. Hawkins, Lake Elmo, MN (US); Amelia W. Koenig, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 892 days.

(21) Appl. No.: 17/415,181

(22) PCT Filed: Dec. 10, 2019

(86) PCT No.: PCT/IB2019/060624
§ 371 (c)(1),
(2) Date: Jun. 17, 2021

(87) PCT Pub. No.: WO2020/128719
PCT Pub. Date: Jun. 25, 2020

(65) Prior Publication Data
US 2022/0055185 A1    Feb. 24, 2022

Related U.S. Application Data

(60) Provisional application No. 62/781,077, filed on Dec. 18, 2018.

(51) Int. Cl.
*B24D 11/00*    (2006.01)
*B24D 18/00*    (2006.01)

(52) U.S. Cl.
CPC .......... *B24D 11/00* (2013.01); *B24D 18/0072* (2013.01); *B24D 2203/00* (2013.01)

(58) Field of Classification Search
CPC .... B24D 11/00; B24D 18/00; B24D 18/0072; B24D 2203/00
See application file for complete search history.

(56) References Cited

U.S. PATENT DOCUMENTS

| 1,910,444 A | 5/1933 | Nicholson |
| 2,141,658 A | 12/1938 | Melton |

(Continued)

FOREIGN PATENT DOCUMENTS

| EP | 1207015 | 5/2002 |
| EP | 3086903 | 7/2015 |

(Continued)

OTHER PUBLICATIONS

International Search Report for PCT International Application No. PCT/IB2019/060613, mailed on Feb. 21, 2020, 4 pages.

(Continued)

*Primary Examiner* — Pegah Parvini

(57) ABSTRACT

Coated abrasive articles having spacer particles are formed by providing a production tool having a dispensing surface with a plurality of cavities, guiding the production tool past an abrasive particle feeder, dispensing shaped abrasive particles onto the dispensing surface and into the plurality of cavities of the production tool, guiding a resin coated backing sheet adjacent the production tool past a spacer particle feeder, and dispensing spacer particles onto the resin coated backing sheet and/or the production tool after the abrasive particle feeder prior to a deposit point for the shaped abrasive particles. The spacer particles are selected to have a thickness that is greater than a thickness of a resin coating of the resin coating backing sheet and a thickness and density once dispensed that are sufficient to substantially (Continued)

prevent the production tool from contacting the resin coated backing sheet at the deposit point.

19 Claims, 5 Drawing Sheets

(56) References Cited

U.S. PATENT DOCUMENTS

| | | | |
|---|---|---|---|
| 3,041,156 | A | 6/1962 | Rowse |
| 3,058,819 | A | 10/1962 | Paulson |
| 3,616,580 | A | 11/1971 | Dewell |
| 3,676,092 | A | 7/1972 | Buell |
| 3,729,873 | A | 5/1973 | Sandell |
| 3,784,365 | A | 1/1974 | Caserta |
| 3,833,346 | A | 9/1974 | Wirth |
| 3,868,232 | A | 2/1975 | Sioui |
| 3,869,834 | A | 3/1975 | Mullin |
| 4,215,516 | A | 8/1980 | Huschle |
| 4,314,827 | A | 2/1982 | Leitheiser |
| 4,475,926 | A | 10/1984 | Hickory |
| 4,623,364 | A | 11/1986 | Cottringer |
| 4,652,275 | A | 3/1987 | Bloecher |
| 4,734,104 | A | 3/1988 | Broberg |
| 4,737,163 | A | 4/1988 | Larkey |
| 4,744,802 | A | 5/1988 | Schwabel |
| 4,751,138 | A | 6/1988 | Tumey |
| 4,770,671 | A | 9/1988 | Monroe |
| 4,799,939 | A | 1/1989 | Bloecher |
| 4,881,951 | A | 11/1989 | Wood |
| 4,997,461 | A | 3/1991 | Markhoff-Matheny |
| 5,009,675 | A | 4/1991 | Kunz |
| 5,011,508 | A | 4/1991 | Wald |
| 5,042,991 | A | 8/1991 | Kunz |
| 5,078,753 | A | 1/1992 | Broberg |
| 5,085,671 | A | 2/1992 | Martin |
| 5,152,917 | A | 10/1992 | Pieper |
| 5,201,916 | A | 4/1993 | Berg |
| 5,203,884 | A | 4/1993 | Buchanan |
| 5,213,591 | A | 5/1993 | Celikkaya |
| 5,269,821 | A | 12/1993 | Helmin |
| 5,352,254 | A | 10/1994 | Celikkaya |
| 5,366,523 | A | 11/1994 | Rowenhorst |
| 5,378,251 | A | 1/1995 | Culler |
| 5,417,726 | A | 5/1995 | Stout |
| 5,435,816 | A | 7/1995 | Spurgeon |
| 5,436,063 | A | 7/1995 | Follett |
| 5,453,106 | A | 9/1995 | Roberts |
| 5,496,386 | A | 3/1996 | Broberg |
| 5,498,268 | A | 3/1996 | Gagliardi |
| 5,520,711 | A | 5/1996 | Helmin |
| 5,609,706 | A | 3/1997 | Benedict |
| RE35,570 | E | 7/1997 | Rowenhorst |
| 5,672,097 | A | 9/1997 | Hoopman |
| 5,766,277 | A | 6/1998 | DeVoe |
| 5,946,991 | A | 9/1999 | Hoopman |
| 5,954,844 | A | 9/1999 | Law |
| 5,961,674 | A | 10/1999 | Gagliardi |
| 5,975,987 | A | 11/1999 | Hoopman |
| 5,975,988 | A | 11/1999 | Christianson |
| 5,984,988 | A | 11/1999 | Berg |
| 6,077,601 | A | 6/2000 | DeVoe |
| 6,129,540 | A | 10/2000 | Hoopman |
| 6,228,133 | B1 | 5/2001 | Thurber |
| 7,553,346 | B2 | 6/2009 | Welygan |
| 8,034,137 | B2 | 10/2011 | Erickson |
| 8,080,072 | B2 | 12/2011 | Woo |
| 8,142,531 | B2 | 3/2012 | Adefris |
| 8,142,532 | B2 | 3/2012 | Erickson |
| 8,142,891 | B2 | 3/2012 | Culler |
| 9,017,150 | B2 | 4/2015 | Keipert |
| 9,440,332 | B2 | 9/2016 | Gaeta |
| 9,457,453 | B2 | 10/2016 | Seth |
| 9,604,346 | B2 | 3/2017 | Breder |
| 9,776,302 | B2 | 10/2017 | Keipert |
| 9,969,057 | B2 | 5/2018 | Eugster |
| 2001/0003884 | A1 | 6/2001 | Wei |
| 2009/0165394 | A1 | 7/2009 | Culler |
| 2009/0169816 | A1 | 7/2009 | Erickson |
| 2012/0227333 | A1 | 9/2012 | Adefris |
| 2013/0040537 | A1 | 2/2013 | Schwabel |
| 2013/0125477 | A1 | 5/2013 | Adefris |
| 2013/0344786 | A1 | 12/2013 | Keipert |
| 2014/0106126 | A1 | 4/2014 | Gaeta |
| 2014/0290147 | A1 | 10/2014 | Seth |
| 2015/0224629 | A1 | 8/2015 | Moren |
| 2015/0291866 | A1 | 10/2015 | Arcona |
| 2016/0311081 | A1 | 10/2016 | Culler |
| 2016/0311084 | A1 | 10/2016 | Culler |
| 2016/0315081 | A1 | 10/2016 | Park |
| 2017/0050293 | A1 | 2/2017 | Gaeta |
| 2017/0225299 | A1 | 8/2017 | Keipert |
| 2017/0368667 | A1 | 12/2017 | Keipert |
| 2018/0029194 | A1 | 2/2018 | Keipert |
| 2018/0086957 | A1 | 3/2018 | Sahlin |

FOREIGN PATENT DOCUMENTS

| | | |
|---|---|---|
| EP | 3319758 | 1/2017 |
| WO | WO 2003-008151 | 1/2003 |
| WO | WO 2007-005452 | 1/2007 |
| WO | WO 2011-068714 | 6/2011 |
| WO | WO 2012-112305 | 8/2012 |
| WO | WO 2012-112322 | 8/2012 |
| WO | WO 2014-131937 | 9/2014 |
| WO | WO 2014-176108 | 10/2014 |
| WO | WO 2014-206967 | 12/2014 |
| WO | WO 2015-100018 | 7/2015 |
| WO | WO 2015-100020 | 7/2015 |
| WO | WO 2015-100220 | 7/2015 |
| WO | WO 2016-028683 | 2/2016 |
| WO | WO 2016-044158 | 3/2016 |
| WO | WO 2016-064726 | 4/2016 |
| WO | WO 2016-089675 | 6/2016 |
| WO | WO 2016-205133 | 12/2016 |
| WO | WO 2016-205267 | 12/2016 |
| WO | WO 2017-007703 | 1/2017 |
| WO | WO 2017-007714 | 1/2017 |
| WO | WO 2017-083249 | 5/2017 |
| WO | WO 2017-083255 | 5/2017 |
| WO | WO 2018-080765 | 5/2018 |
| WO | WO 2018-118596 | 6/2018 |
| WO | WO 2018-118690 | 6/2018 |
| WO | WO 2018-118695 | 6/2018 |
| WO | WO 2018-134732 | 7/2018 |
| WO | WO 2018-207145 | 11/2018 |
| WO | WO 2019-215571 | 11/2019 |
| WO | WO 2020-128716 | 6/2020 |
| WO | WO 2020-128717 | 6/2020 |
| WO | WO 2020-128720 | 6/2020 |
| WO | WO 2020-128752 | 6/2020 |
| WO | WO 2020-128833 | 6/2020 |
| WO | WO 2020-128838 | 6/2020 |
| WO | WO 2020-128842 | 6/2020 |
| WO | WO 2020-128844 | 6/2020 |
| WO | WO 2020-128845 | 6/2020 |
| WO | WO 2020-128852 | 6/2020 |
| WO | WO 2020-128853 | 6/2020 |
| WO | WO 2020-128854 | 6/2020 |
| WO | WO 2020-128857 | 6/2020 |
| WO | WO 2020-128858 | 6/2020 |

OTHER PUBLICATIONS

International Search Report for PCT International Application No. PCT/IB2019/060615, mailed on Feb. 26, 2020, 5 pages.
International Search Report for PCT International Application No. PCT/IB2019/060624, mailed on Mar. 11, 2020, 4 pages.
International Search Report for PCT International Application No. PCT/IB2019/060627, mailed on Jul. 2, 2020, 8 pages.
International Search Report for PCT International Application No. PCT/IB2019/060779, mailed on Mar. 10, 2020, 5 pages.
International Search Report for PCT International Application No. PCT/IB2019/060924, mailed on Apr. 29, 2020, 4 pages.

(56) References Cited

OTHER PUBLICATIONS

International Search Report for PCT International Application No. PCT/IB2019/060929, mailed on Mar. 23, 2020, 4 pages.
International Search Report for PCT International Application No. PCT/IB2019/060934, mailed on Mar. 18, 2020, 5 pages.
International Search Report for PCT International Application No. PCT/IB2019/060936, mailed on Mar. 30, 2020, 5 pages.
International Search Report for PCT International Application No. PCT/IB2019/060938, mailed on Apr. 28, 2020, 4 pages.
International Search Report for PCT International Application No. PCT/IB2019/060947, mailed on Mar. 30, 2020, 5 pages.
International Search Report for PCT International Application No. PCT/IB2019/060949, mailed on Jun. 5, 2020, 4 pages.
International Search Report for PCT International Application No. PCT/IB2019/060950, mailed on Mar. 30, 2020, 5 pages.
International Search Report for PCT International Application No. PCT/IB2019/060953, mailed on Apr. 2, 2020, 4 pages.
International Search Report for PCT International Application No. PCT/IB2019/060954, mailed on Apr. 24, 2020, 5 pages.

COATED ABRASIVE ARTICLE HAVING SPACER PARTICLES, MAKING METHOD AND APPARATUS THEREFOR

CROSS REFERENCE TO RELATED APPLICATIONS

This application is a national stage filing under 35 U.S.C. 371 of PCT/IB2019/060624, filed Dec. 10, 2019, which claims the benefit of U.S. Provisional Application No. 62/781,077, filed Dec. 18, 2018, the disclosures of which are incorporated by reference in their entireties herein.

TECHNICAL FIELD

The present disclosure broadly relates to methods of making coated abrasive articles and, more particularly, to methods of manufacturing coated abrasive articles including spacer particles to maintain precise gap control between the production tooling and the resin layer backing during manufacture.

BACKGROUND

U.S. Patent Application Pub. No. 2016/0311081, to 3M Company St. Paul MN, discloses a coated abrasive article maker apparatus including a first web path that guides a production tooling such that it wraps a portion of the outer circumference of an abrasive particle transfer roll and a second web path for a resin coated backing that guides the resin coated backing such that it wraps a portion of the outer circumference of the abrasive particle transfer roll with the resin layer positioned facing the dispensing surface of the production tooling that is positioned between the resin coated backing and the outer circumference of the abrasive particle transfer roll. The abrasive particles are transferred from cavities in the production tooling to the resin coated backing as the resin coated backing and the production tooling traverse around the abrasive particle transfer roll. The production tooling includes cavities that are complementary in shape and size to the abrasive particles being coated. The cavities of the production tooling position and orient the abrasive particles (especially shaped abrasive particles) for transfer to resin layer coated backing sheets to create the coated abrasive particles.

The first web path forms the production tooling into an endless belt for continuous transfer by, for example, thermally splicing the ends of the production tooling. The production tooling then passes an abrasive particle feeder that dispenses abrasive particles onto the dispensing surface and into the cavities. The abrasive particles are transferred from the cavities to the resin coated backing as the resin coated backing and the production tooling come together in a particle transfer zone on the outer circumference of the abrasive particle transfer roll.

The resulting coated abrasive article generally includes abrasive articles with the desired density and particle orientation throughout the coated abrasive article. However, it has been found that precise gap control between the production tooling and the resin layer backing during manufacture is sometimes difficult. When the production tooling touches the resin layer backing during manufacture, the depositing of the shaped abrasive particles onto the resin layer backing may become inconsistent, resulting in a defect in the coated abrasive article. It is desired to minimize such possible defects during manufacturing of the coated abrasive articles.

SUMMARY OF THE DISCLOSURE

The present disclosure addresses the above-mentioned and other needs in the art by providing a method of making coated abrasive articles by providing a production tool having a dispensing surface with a plurality of cavities, guiding the production tool in a direction of travel past an abrasive particle feeder, dispensing shaped abrasive particles onto the dispensing surface and into the plurality of cavities of the production tool, and guiding a resin coated backing sheet adjacent the production tool in the direction of travel past a spacer particle feeder. In sample embodiments, spacer particles are dispensed onto the resin coated backing sheet in the direction of travel and/or the production tool after the abrasive particle feeder in the direction of travel prior to a deposit point. The spacer particles have a thickness that is greater than a thickness of a resin coating of the resin coating backing sheet and a thickness and density once dispensed on the resin coating backing sheet that are sufficient to substantially prevent the production tool from contacting the resin coated backing sheet at the deposit point. The shaped abrasive particles from the plurality of cavities of the production tool are then provided onto the resin coated backing sheet at the deposit point, and the spacer particles substantially prevent the production tooling from contacting the resin coated backing sheet at the deposit point.

In sample embodiments, the spacer particles are dispensed onto the resin coated backing sheet and/or the production tool in a predetermined pattern. The spacer particles may be friable and may further comprise an abrasive agglomerate and/or a grinding aid.

In sample embodiments, the spacer particles are square and/or trapezoidal in shape so as to form a truncated pyramid where the spacer particles have sloped sidewalls. Alternatively, the spacer particles may be spherical in shape and formed of glass spheres or glass bubbles.

The spacer particles may be formed of materials having different purposes. For example, the spacer particles may be made of a material selected to withstand a crushing force between the production tool and the resin coated backing sheet at the deposit point. The spacer particles also may be made of a material that melts or evaporates at elevated temperatures above ambient room temperature.

In sample embodiments, such methods may be implemented by a coated abrasive article maker apparatus comprising a production tool having a dispensing surface with a plurality of cavities; at least one roller that guides the production tool through the coated abrasive article maker apparatus, the at least one roller including at least one drive roll for pulling the production tool in a direction of travel; an abrasive particle feeder positioned adjacent the production tool so as to dispense shaped abrasive particles onto the dispensing surface and into the plurality of cavities of the production tool; a resin coated backing sheet feeder that guides a resin coated backing sheet through the coated abrasive article maker apparatus in the direction of travel, the resin coated backing sheet positioned to receive shaped abrasive particles from the plurality of cavities of the production tool at a deposit point; and a spacer particle feeder positioned to dispense spacer particles onto the resin coated backing sheet in the direction of travel and/or the production tool after the abrasive particle feeder in the direction of travel prior to the deposit point. The spacer particles so deposited have a thickness that is greater than a thickness of a resin coating of the resin coating backing sheet and a thickness and density once dispensed on the resin coating backing sheet that are sufficient to substantially prevent the production tool from contacting the resin coated backing sheet at the deposit point. The spacer particle feeder may be adapted to dispense the spacer particles onto the resin coated backing sheet and/or the production tool in a predetermined pattern.

Coated abrasive articles so manufactured include shaped abrasive particles and interspersed spacer particles that may be, for example, crushed or shaped abrasive particles that may be friable and that may be used as an abrasive agglomerate and/or a grinding aid. The spacer particles may be formed of different materials depending upon the application for the coated abrasive article. For example, the spacer particles may be made of a material suitable for use as a grinding aid that further may withstand a crushing force between the production tool and the resin coated backing sheet at the deposit point. The spacer particles also may be made of a material that melts or evaporates at elevated temperatures above ambient room temperature. Thus, the spacer particles may be durable or designed to disappear after use during manufacture of the coated abrasive article.

BRIEF DESCRIPTION OF THE FIGURES

The drawings illustrate generally, by way of example, but not by way of limitation, various embodiments discussed in the present document.

DETAILED DESCRIPTION

Figure 1:
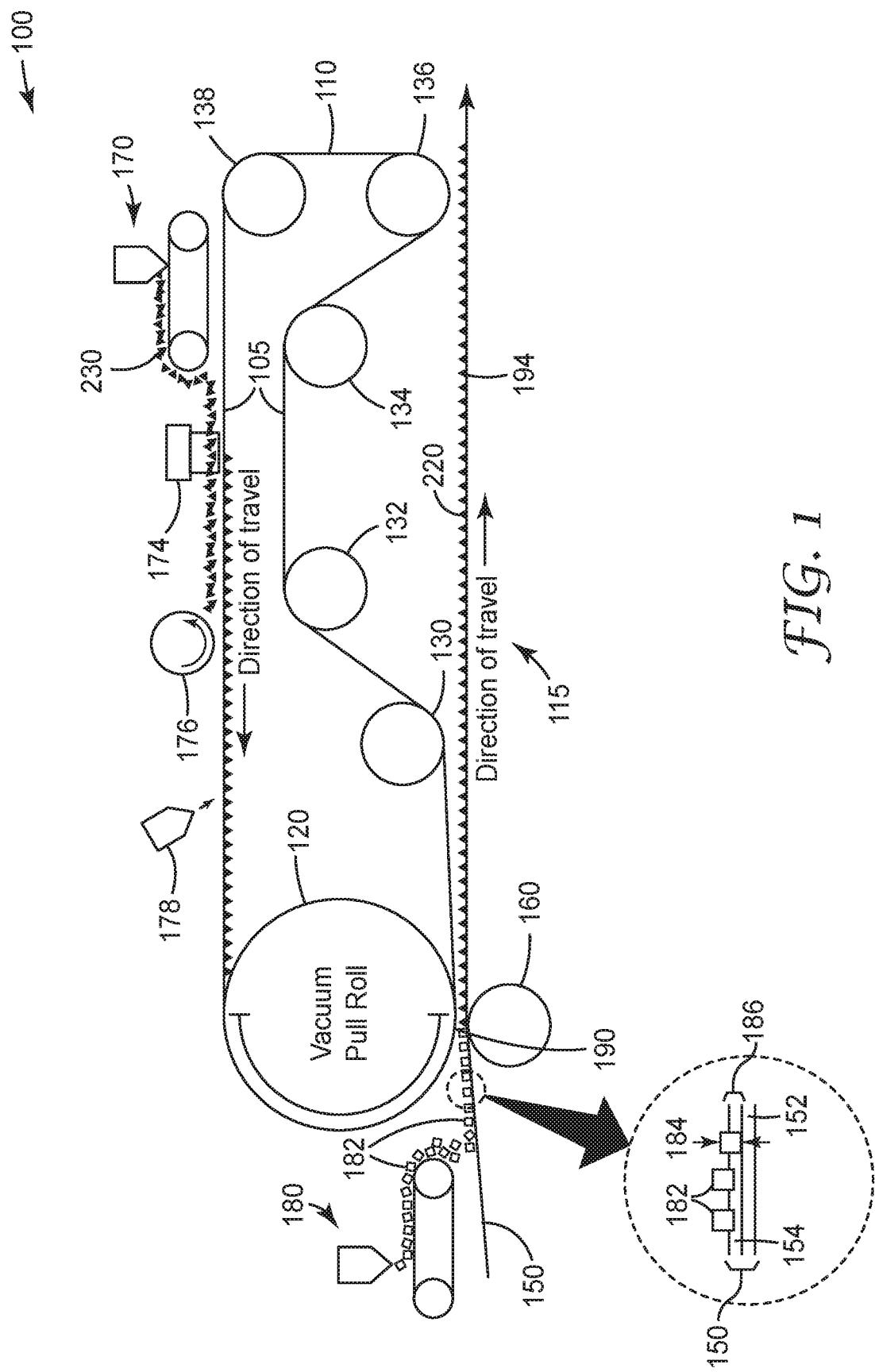
FIG. 1 is a schematic view of an apparatus for making a coated abrasive article according to a first embodiment.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

As used herein "shaped abrasive particle" means an abrasive particle having a predetermined or non-random shape. One process to make a shaped abrasive particle such as a shaped ceramic abrasive particle includes shaping the precursor ceramic abrasive particle in a mold having a predetermined shape to make ceramic shaped abrasive particles. Ceramic shaped abrasive particles, formed in a mold, are one species in the genus of shaped ceramic abrasive particles. Other processes to make other species of shaped ceramic abrasive particles include extruding the precursor ceramic abrasive particle through an orifice having a predetermined shape, printing the precursor ceramic abrasive particle though an opening in a printing screen having a predetermined shape, or embossing the precursor ceramic abrasive particle into a predetermined shape or pattern. In other examples, the shaped ceramic abrasive particles can be cut from a sheet into individual particles. Examples of suitable cutting methods include mechanical cutting, laser cutting, or water jet cutting. Non-limiting examples of shaped ceramic abrasive particles include shaped abrasive particles, such as triangular plates, or elongated ceramic rods/filaments. Shaped ceramic abrasive particles are generally homogenous or substantially uniform and maintain their sintered shape without the use of a binder such as an organic or inorganic binder that bonds smaller abrasive particles into an agglomerated structure and excludes abrasive particles obtained by a crushing or comminution process that produces abrasive particles of random size and shape. In many embodiments, the shaped ceramic abrasive particles comprise a homogeneous structure of sintered alpha alumina or consist essentially of sintered alpha alumina. Shaped abrasive particles as described herein can include any number of shape features. The shape features can help to improve the cutting performance of any of shaped abrasive particles. Examples of suitable shape features include an opening, a concave surface, a convex surface, a groove, a ridge, a fractured surface, a low roundness factor, or a perimeter comprising one or more corner points having a sharp tip. Individual shaped abrasive particles can include any one or more of these features.

As noted in the background section above, it has been found that precise gap control between the production tooling and the resin layer backing during manufacture is sometimes difficult. When the production tooling touches the resin layer backing during manufacture, the depositing of the shaped abrasive particles onto the resin layer backing may become inconsistent, resulting in a defect in the coated abrasive article. It is desired to use spacer particles during the manufacturing of the coated abrasive article to minimize such possible defects.

FIG. 1 is a schematic view of a coated abrasive article maker apparatus 100 for making a coated abrasive article according to a first embodiment. Coated abrasive article maker 100 according to the present disclosure includes shaped abrasive particles 220 removably disposed within cavities 230 of production tooling 210 (FIG. 2A) where a first web path 105 guides the production tooling 210 through coated abrasive article maker apparatus 100. In sample embodiments, the ends of the production tooling 210 are spliced together so that the production tooling 210 forms the first web path 105 as an endless loop 110. A vacuum pull roll 120 rotates counterclockwise in the view of FIG. 1 to apply a vacuum to hold the shaped abrasive particles 220 against the vacuum pull roll 120 and to advance the endless loop 110. The production tooling 210 is guided over idler rollers 130, 132, 134, 136, and 138 in the indicated direction of travel to move the production tooling 210 with cavities 230 in the endless production loop 110.

In sample embodiments, the production tooling 210 is moved past an abrasive particle feeder 170 that supplies at least some shaped abrasive particles 220 to the production tooling 210 as illustrated. Preferably, the abrasive particle feeder 170 supplies an excess of shaped abrasive particles 220 such that there are more shaped abrasive particles 220 present per unit length of the production tooling 210 in the machine direction than cavities 230 present. Supplying an excess of shaped abrasive particles 220 helps to ensure that all cavities within the production tooling 210 are eventually filled with a shaped abrasive particle 220. Since the bearing area and spacing of the shaped abrasive particles 220 is often designed into the production tooling 210 for the specific grinding application, it is generally desirable to not have too many unfilled cavities 230. The abrasive particle feeder 170 is typically the same width as the production tooling 210 and supplies shaped abrasive particles 220 across the entire width of the production tooling 210. The abrasive particle feeder 170 can be, for example, a vibratory feeder, a hopper, a chute, a silo, a drop coater, or a screw feeder.

Optionally, a filling assist member 174 and/or 176 is provided after the abrasive particle feeder 170 to move the shaped abrasive particles 220 around on the dispensing surface 240 of the production tooling 210 and to help orientate or slide the shaped abrasive particles 220 into the cavities 230. The filling assist member 174 and/or 176 can be, for example, a doctor blade, a felt wiper, a rotary or fill brush having a plurality of bristles, a vibration system, a blower or air knife, a vacuum box, or combinations thereof. The filling assist member 174 and/or 176 moves, translates, sucks, or agitates the shaped abrasive particles 220 on the dispensing surface 240 to place more shaped abrasive particles 220 into the cavities 230. Without the filling assist member 174 and/or 176, generally at least some of shaped abrasive particles 220 dropped onto the dispensing surface 240 will fall directly into a cavity 230 and no further movement is required but others may need some additional movement to be directed into a cavity 230. Optionally, the filling assist member 174 and/or 176 can be oscillated laterally in the cross-machine direction or otherwise have a relative motion such as circular or oval to the surface of the production tooling 210 using a suitable drive to assist in completely filling each cavity 230 in the production tooling 210 with a shaped abrasive particle 220. Typically, if a brush is used as the filling assist member 174 and/or 176, the bristles may cover a section of the dispensing surface 240 from 2-4 inches (5.0-10.2 cm) in length in the machine direction preferably across all or most all of the width of the dispensing surface 240 and lightly rest on or just above the dispensing surface 240 and be of a moderate flexibility. The production tooling 210 may be supported or pushed on by a shoe or a plate to assist in keeping it planar in the portion of the apparatus 100 where the shaped abrasive particles 220 are dispensed or else a vacuum box may be disposed beneath the production tooling 210 in this portion of the apparatus 100. It will be appreciated by those skilled in the art that where the shaped abrasive particle 220 is fully contained within the cavity 230 of the production tooling 210, that is to say where the majority (e.g., 80, 90, or 95 percent) of the shaped abrasive particles 220 in the cavities 230 do not extend past the dispensing surface 240 of the production tooling 210, it is easier for the filling assist member 174 and/or 176 to move the shaped abrasive particles 220 around on the dispensing surface 240 of the production tooling 210 without dislodging an individual shaped abrasive particle 220 already contained within an individual cavity 230.

Optionally, as the production tooling 210 advances in the direction of travel, the cavities 230 move to a higher elevation and can optionally reach a higher elevation than the outlet of the abrasive particle feeder 170 for dispensing shaped abrasive particles 220 onto the dispensing surface 240 of the production tooling 210. In the illustrated embodiment where the production tooling 210 is spliced into an endless belt 110, the belt 110 can have a positive incline to advance to a higher elevation as it moves past the abrasive particle feeder 170. On the other hand, if the production tooling 210 is a roll, the abrasive particle feeder 170 can be positioned such that it applies the shaped abrasive particles 220 to the roll before top dead center of the roll's outer circumference such as between 270 degrees to 350 degrees on the face of the roll with top dead center being 0 degrees as one progresses clockwise about the roll with the roll turning in a clockwise in operation. In any case, by applying the shaped abrasive particles 220 to an inclined dispensing surface 240 the production tooling 210 can enable better filling of the cavities 230 as the shaped abrasive particles 220 can slide or tumble down the inclined dispensing surface 240 of the production tooling 210 thereby enhancing the possibility of falling into a cavity 230. In embodiments where the shaped abrasive particle 220 is fully contained within the cavity 230 of the production tooling 210, that is to say where the majority (e.g., 80, 90, or 95 percent) of the shaped abrasive particles 220 in the cavities 230 do not extend past the dispensing surface 240 of the production tooling 210, the incline can also assist in removing excess shaped abrasive particles 220 from the dispensing surface 240 of the production tooling 210 since excess shaped abrasive particles 220 can slide off the dispensing surface 240 of the production tooling 210. The incline may be between zero degrees up to an angle where the shaped abrasive particles 220 begin to fall out of the cavities 230. The preferred incline will depend on the shaped abrasive particle 220 shape and the magnitude of the force (e.g., friction or vacuum) holding the shaped abrasive particle 220 in the cavity 230. In some embodiments, the positive incline is in a range of from +10 to +80 degrees, or from +10 to +60 degrees, or from +10 to +45 degrees.

Optionally, an abrasive particle removal member 178 may be provided to assist in removing the excess shaped abrasive particles 220 from the dispensing surface 240 of the production tooling 210 once most or all of the cavities 230 have been filled by a shaped abrasive particle 220. The abrasive particle removal member 178 may be, for example, a source of air to blow the excess shaped abrasive particles 220 off the dispensing surface 240 of the production tooling 210 such as an air wand, air shower, air knife, a coanda effect nozzle, or a blower. A contacting device also may be used as the abrasive particle removal member 178 such as a brush, a scraper, a wiper, or a doctor blade. A vibrator, such as an ultrasonic horn, also may be used as the abrasive particle removal member 178. Alternatively, a vacuum source such as vacuum box or vacuum pull roll 120 located along a portion of the first web path after the abrasive particle feeder 170 can be used to hold the shaped abrasive particles 220 in the cavities 230. In this span or section of the first web path 105, the dispensing surface 240 of the production tooling 210 can be inverted or have a large incline or decline approaching or exceeding 90 degrees to remove the excess shaped abrasive particles 220 using the force of gravity to slide or drop them from the dispensing surface 240 while retaining the shaped abrasive particles 220 disposed in the cavities 230 by vacuum until the dispensing surface 240 is returned to an orientation to keep the shaped abrasive particles 220 in the cavities 230 due to the force of gravity or they are released from the cavities 230 onto the resin coated backing at dispensing point 190 as illustrated in FIG. 1. In embodiments where the shaped abrasive particle 220 is fully contained within the cavity 230 of the production tooling 210, that is to say where the majority (e.g., 80, 90, or 95 percent) of the shaped abrasive particles 220 in the cavities 230 do not extend past the dispensing surface 240 of the production tooling 210, the abrasive particle removal member 178 can slide the excess shaped abrasive particles 220 across the dispensing surface 240 of the production tooling 210 and off of the production tooling 210 without disturbing the shaped abrasive particles 220 contained within the cavities 230. The removed excess shaped abrasive particles 220 can be collected and returned to the abrasive particle feeder 170 for reuse. The excess shaped abrasive particles 220 can alternatively be moved in a direction opposite to the direction of travel of the production tooling 210 past or towards the abrasive particle feeder 170 where they may fill unoccupied cavities 230.

In the embodiment of FIG. 1, the vacuum pull roll 120 pulls the production tooling 210 towards the resin coated backing 150. The elevation of the production tooling 210 in this section is not particularly important as long as the shaped abrasive particles 220 are retained in the cavities 230 and the production tooling 210 could continue to incline, decline, or travel horizontally. Choice of the positioning is often determined by existing space within the machine if retrofitting an existing coated abrasive particle maker apparatus 100. The vacuum pull roll 120 uses a vacuum to hold the shaped abrasive particles 220 in the cavities 230 of the production tooling 210 until the shaped abrasive particles 220 reach the dispensing point 190, at which time the vacuum is released and the shaped abrasive particles 220 fall by the force of gravity onto the resin coated backing 150. It will be appreciated by those skilled in the art that various methods can be employed to transfer the shaped abrasive particles 220 from cavities 230 of the production tooling 210 to the resin coated backing 150.

One method for transferring the shaped abrasive particles includes a pressure assist method where each cavity 220 in production tooling 210 has two open ends or the back surface or the entire production tooling 210 is suitably porous and the vacuum pull roll 120 has a plurality of apertures and an internal pressurized source of air. With pressure assist, production tooling 210 does not need to be inverted but it still may be inverted. Vacuum pull roll 120 can also have movable internal dividers such that the pressurized air can be supplied to a specific Marc segment or circumference of the roll to blow shaped abrasive particles 220 out of the cavities 230 and onto the resin coated backing 150 at the deposit point 190. The vacuum pull roll 120 may also be provided with an internal source of vacuum without a corresponding pressurized region or in combination with the pressurized region typically prior to the pressurized region as the vacuum pull roll 120 rotates. The vacuum source or region can have movable dividers to direct it to a specific region or arc segment of the vacuum pull roll 120. The vacuum can suck shaped abrasive particles 220 firmly into cavities 230 as the production tooling 210 wraps around the vacuum pull roll 120 before subjecting the shaped abrasive particles 220 to the pressurized region of the vacuum pull roll 120. This vacuum region be used, for example, with shaped abrasive particle removal member 178 to remove excess shaped abrasive particles 220 from dispensing surface 240 or may be used to simply ensure shaped abrasive particles 220 do not leave cavities 230 before reaching the deposit point 190. Those skilled in the art will further appreciate that gravity assist, pushing assist, vibration assist, or a combination of such methods may also be used. Further descriptions of these techniques may be found in U.S. Patent Publication No. 2016/0311081, to 3M Company, St. Paul MN, the contents of which are incorporated herein by reference.

In sample embodiments, the resin coated backing 150 is provided to the coated abrasive particle maker apparatus 100 by a guide apparatus including one or more idler rollers 160, unwind rolls (not shown) and pull rolls (not shown). The resin coated backing 150 may be formed by a make coat delivery system and a make coat applicator (not shown) using methods well-known to those skilled in the art. Suitable unwinds, make resins, coaters and backcoat delivery systems, and make coatings are also known to those of skill in the art. The make coat delivery system can be a simple pan or reservoir containing the make coat resin or a pumping system with a storage tank and delivery plumbing to translate the make coat resin to the needed location. The backing sheet 152 can be a cloth, paper, film, nonwoven, scrim, or other web substrate. The make coat applicator can be, for example, a coater, a roll coater, a spray system, or a rod coater. Alternatively, a precoated coated backing can be positioned by the idler roller 160 for application of the shaped abrasive particles 220 to top surface of the precoated coated backing.

Together, such components unwind a backing sheet, deliver a make coat resin via the make coat delivery system to a make coat applicator and apply a make coat resin 154 to a surface of the backing sheet 152 to form the resin coated backing 150. Thereafter, the resin coated backing 150 is positioned by idler roller 160 for application of the shaped abrasive particles 220 to the resin coated surface of the resin coated backing 150 to form the coated abrasive article 194 including the deposited shaped abrasive particles 220. A second web path 115 for the resin coated backing 150 through the coated abrasive article maker apparatus 100 may further include a pull roll that pulls the coated abrasive article 194 in the indicated direction of travel through the coated abrasive article maker apparatus 100. Together, the idler rollers 160, unwind roll and pull roll guide the resin coated backing 150 through the coated abrasive article maker apparatus 100.

After the deposit point 190, the production tooling 210 travels along the first web path 105 back towards the abrasive particle filler 170 and filling assist members 174 and 176 with the assistance of idler rollers 130, 132, 134, 136, and 138, as necessary. An optional production tooling cleaner (not shown) can be provided to remove stuck shaped abrasive particles 220 still residing in the cavities 230 and/or to remove make coat resin transferred to the dispensing surface 240. Choice of the production tooling cleaner will depend on the configuration of the production tooling 210 and could be either alone or in combination, an additional air blast, solvent or water spray, solvent or water bath, an ultrasonic horn, or an idler roller the production tooling wraps to use push assist to force the shaped abrasive particles 220 out of the cavities 230. Thereafter the endless belt of production tooling 210 advances to the abrasive particle filler 170 and filling assist members 174 and 176 to be filled with new shaped abrasive particles 220.

Similarly, various idler rollers may be used to guide the coated abrasive article 194 having a predetermined, reproducible, non-random pattern of shaped abrasive particles 220 on a first major surface that were applied at the deposit point 190 and held onto the first major surface of the resin coated backing 150 by the make coat resin along the second web path 115 into an oven for curing the make coat resin. Optionally, a second abrasive particle coater can be provided to place additional shaped abrasive particles 220, such as another type of abrasive particle or diluents, onto the make coat resin prior to the oven. The second abrasive particle coater can be a drop coater, spray coater, or an electrostatic coater as known to those of skill in the art. Thereafter, the cured coated abrasive article 194 can enter into an optional festoon along the second web path 115 prior to further processing such as the addition of a size coat, curing of the size coat, and other processing steps known to those of skill in the art of making coated abrasive articles.

In some embodiments, the speed of the dispensing surface 240 of the production tooling 210 and the speed of the resin coated backing 150 are speed matched to each other within ±10 percent, ±5 percent, or ±1 percent, for example. This permits the positioning of each shaped abrasive particle 220 onto the resin coated backing 150 to substantially reproduce the pattern of shaped abrasive particles 220 and their specific orientation as arranged in the production tooling 210. However, the relative speeds of the dispensing surface 240 of the production tooling 210 and the resin coated backing 150 may be adjusted so that patterns of shaped abrasive particles 220 having different densities may be formed on the resin coated backing 150.

In sample embodiments, the coated abrasive article maker apparatus 100 further includes a spacer particle filler 180 that dispenses spacer particles 182 onto the resin coated backing 150 before the resin coated backing 150 arrives at the deposit point 190. As illustrated in the expanded view in FIG. 1, the spacer particles 182 are drop coated by depositing the spacer particles 182 onto the resin coated backing layer 150. As illustrated, the spacer particles 182 have a height that is sufficient to maintain a gap between the production tooling 210 and the resin coated backing 150 at the deposit point 190. In particular, the particles 182 have a height 184 that is greater than the height 186 of the resin layer 154 formed on the backing sheet 152. Thus, even when compressed, the spacer particles 182 will maintain a gap between the production tooling 210 and the resin coated backing 150 at the deposit point 190. The spacer particles 182 thus allows for a contact transfer method that does not require precise gap control between the production tooling 210 and the resin coated backing 150.

Figure 2A:
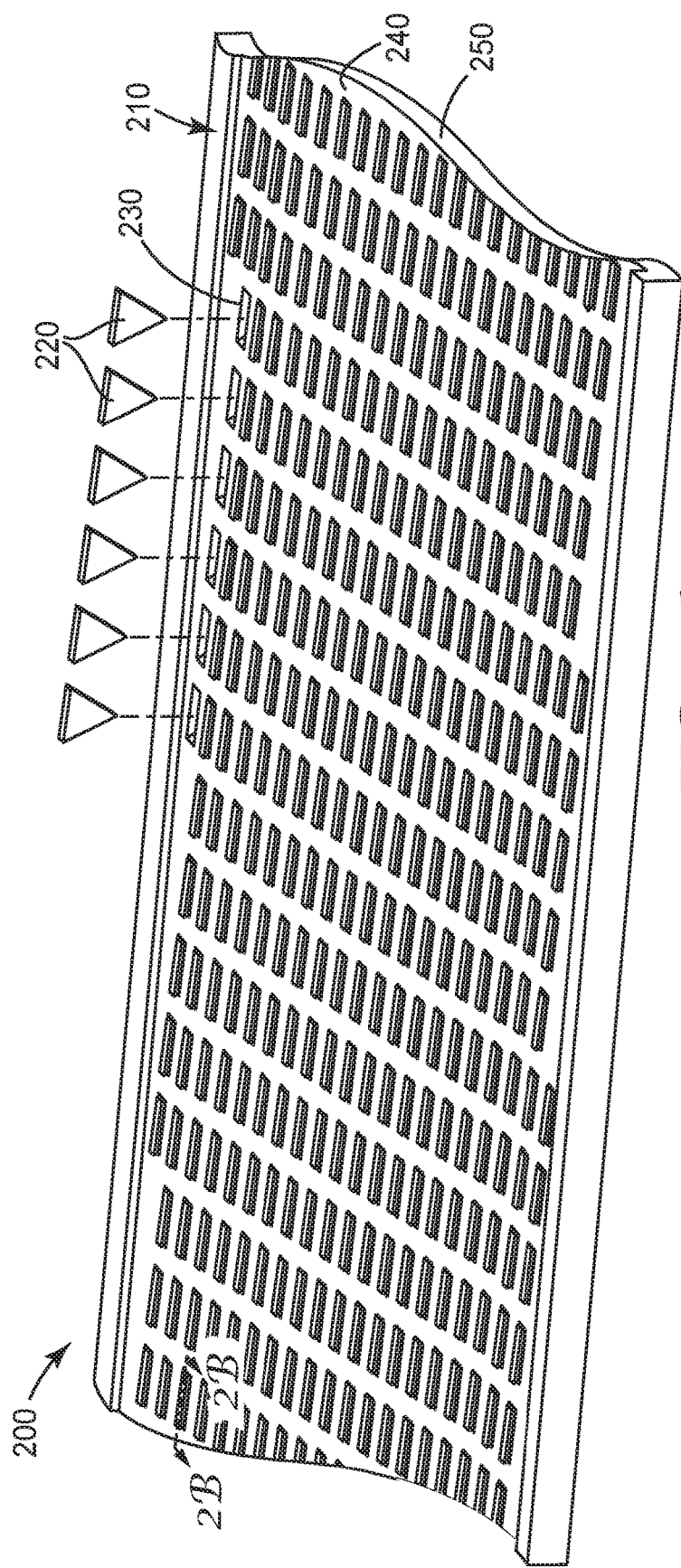
FIG. 2A illustrates a schematic perspective view of an exemplary production tooling in a sample embodiment.
Figure 2B:
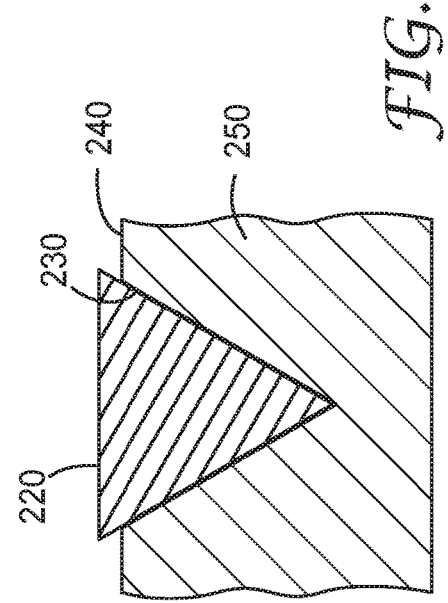
FIG. 2B is a schematic cross-sectional side view of the positioning of an abrasive article in a cavity of the production tooling of FIG. 2A, taken along plane 2B-2B.

FIG. 2A illustrates a schematic perspective view of an exemplary production tooling 210 in a sample embodiment. As shown in FIG. 2A, the abrasive particle positioning system 200 includes production tooling 210 and shaped abrasive particles 220. In FIG. 2A, the shaped abrasive particles 220 are illustrated as an equilateral triangle conforming to a truncated pyramid, although other shapes are certainly possible and within the scope of the present description as noted in more detail below. The shaped abrasive particles 220 are disposed partially within cavities 230 in a dispensing surface 240 of carrier member 250 of the production tooling 210 as shown in FIG. 2B, which is a schematic cross-sectional side view of the positioning of an abrasive article 220 in a cavity 230 of the production tooling 210 of FIG. 2A, taken along plane 2B-2B. As illustrated, the plurality of cavities 230 have a complimentary shape to intended shaped abrasive particle 220 to be contained therein whereby the shaped abrasive particles 220 protrude slightly from the respective cavities 230 as illustrated in FIG. 2B.

Figure 3A:
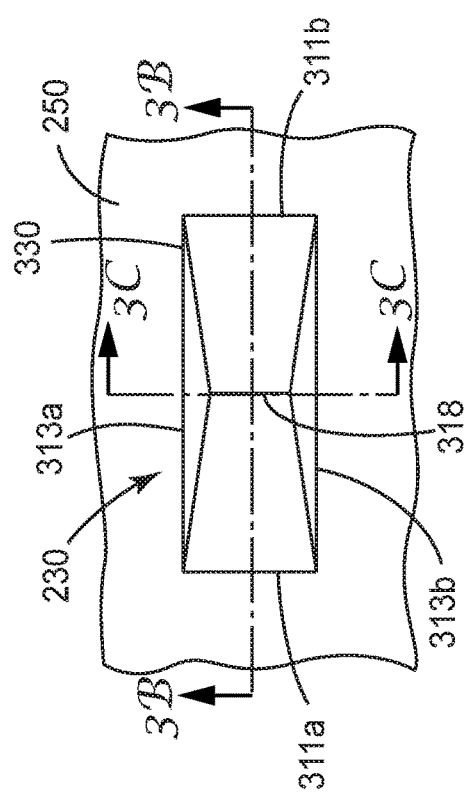
FIG. 3A is an enlarged schematic top view of an exemplary cavity design suitable for use as the cavities of the production tooling in sample embodiments.
Figure 3C:
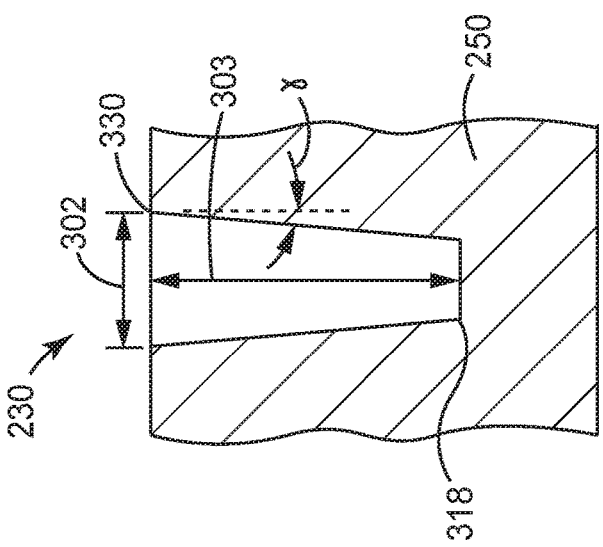
FIG. 3C is a cross-sectional view of FIG. 3A taken along plane 3C-3C.
Figure 3B:
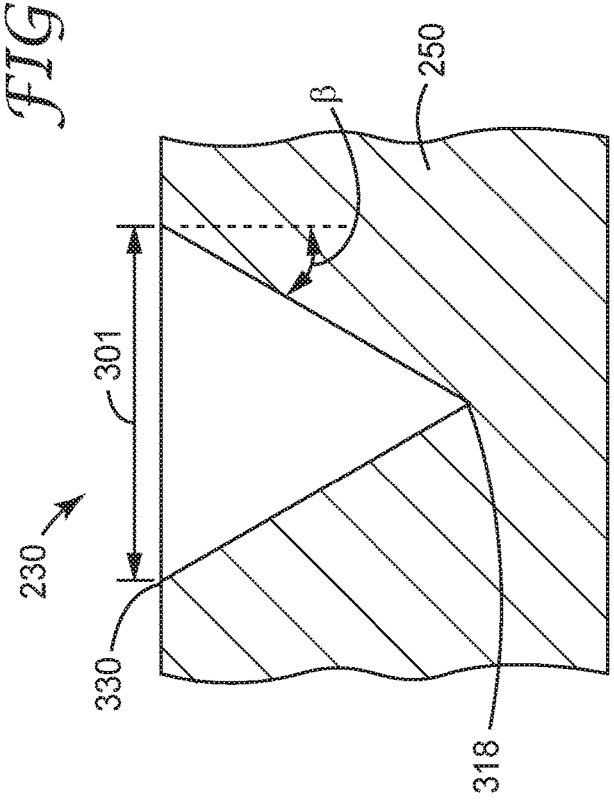
FIG. 3B is a cross-sectional view of FIG. 3A taken along plane 3B-3B.

An embodiment of a cavity 230 for accepting shaped abrasive particles 220 is shown in FIGS. 3A-3C. As illustrated, an exemplary cavity 230 in carrier member 250 has length 301 (FIG. 3B), width 302 (FIG. 3C), and depth 303 (FIG. 3C). Cavity 230 comprises four sidewalls 311a, 311b, 313a, 313b. Sidewalls 311a, 311b extend from openings 330 at dispensing surface 240 of carrier member 250 and taper inward at a taper angle β with increasing depth until they meet at line 318 (see FIG. 3B). Likewise, sidewalls 313a, 313b taper inwardly at a taper angle γ with increasing depth until they contact line 318 (see FIGS. 3A and 3C).

Taper angles β and γ will typically depend on the specific shaped abrasive particles 220 selected for use with the production tooling 210, preferably corresponding to the shape of the shaped abrasive particles 220. In this embodiment, taper angle β may have any angle greater than 0 and less than 90 degrees. In some embodiments, taper angle β has a value in the range of 40 to 80 degrees, preferably 50 to 70 degrees, and more preferably 55 to 65 degrees. Taper angle γ will likewise typically depend on the shape of the shaped abrasive particles 220 that are selected. In this embodiment, taper angle γ may have any angle in the range of from 0 to 30 degrees. In some embodiments, taper angle γ has a value in the range of 5 to 20 degrees, preferably 5 to 15 degrees, and more preferably 8 to 12 degrees.

In some embodiments, the cavities 230 are open at both the dispensing and the back surfaces. In some of these embodiments, the first and third sidewalls 311a, 313a do not contact each other and the second and fourth sidewalls 311b, 313b do not contact each other.

Figure 4:
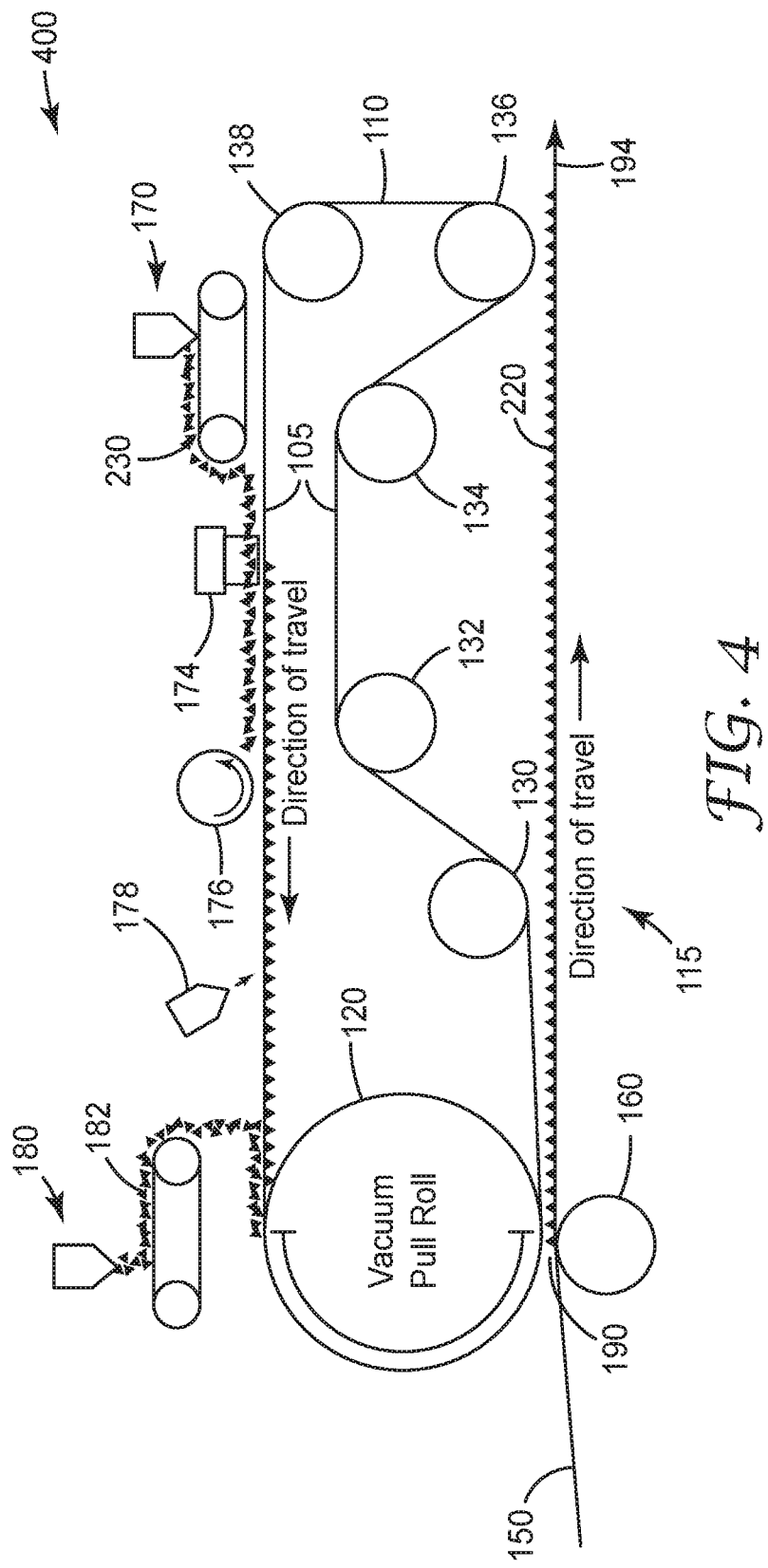
FIG. 4 is a schematic view of an apparatus for making a coated abrasive article according to a second embodiment.

FIG. 4 is a schematic view of an apparatus 400 for making a coated abrasive article 194 according to a second embodiment. The apparatus 400 of FIG. 4 is essentially the same as that of the embodiment of FIG. 1 except that the spacer particle filler 180 is disposed to dispense the spacer particles 182 onto the production tooling 210 instead of the resin coated backing 150. In this embodiment, the spacer particles 182 may be held in place by the vacuum force of the vacuum pull roll 120 and/or the production tooling 210 may be modified to include pockets for accepting the spacer particles 182. In either case, the spacer particles 182 would be held in place through the deposit point 190 to maintain a desired gap between the production tooling 210 and the resin coated backing 150.

It will be appreciated that the production tooling 210 could be modified to include permanent spacers that are permanently affixed to the production tooling 210 in order to maintain the desired gap with the resin coated backing 150 at the deposit point 190. However, such an embodiment would not transfer the spacer particles 182 to the coated abrasive article 194 and thus would not benefit from the presence of the spacer particles 182 on the coated abrasive article 194. Such benefits include the use of monolithic spacer particles 182 (e.g., crushed or shaped abrasive particles) as an abrasive agglomerate and/or a grinding aid. In such applications, the spacer particles 182 would be interspersed with the shaped abrasive particles 220 and would be formed of friable materials. The materials selected for the spacer particles 182 would depend upon the application for the coated abrasive article 194. For example, the spacer particles 182 may be made of a material suitable for use as an abrasive agglomerate and/or a grinding aid yet that may also withstand a crushing force between the production tool 210 and the resin coated backing sheet 150 at the deposit point 190. The spacer particles 182 also may be made of a material that melts or evaporates at elevated temperatures above ambient room temperature. Thus, the spacer particles 182 may be durable or disappearing, as desired, based on the application.

Figure 5:
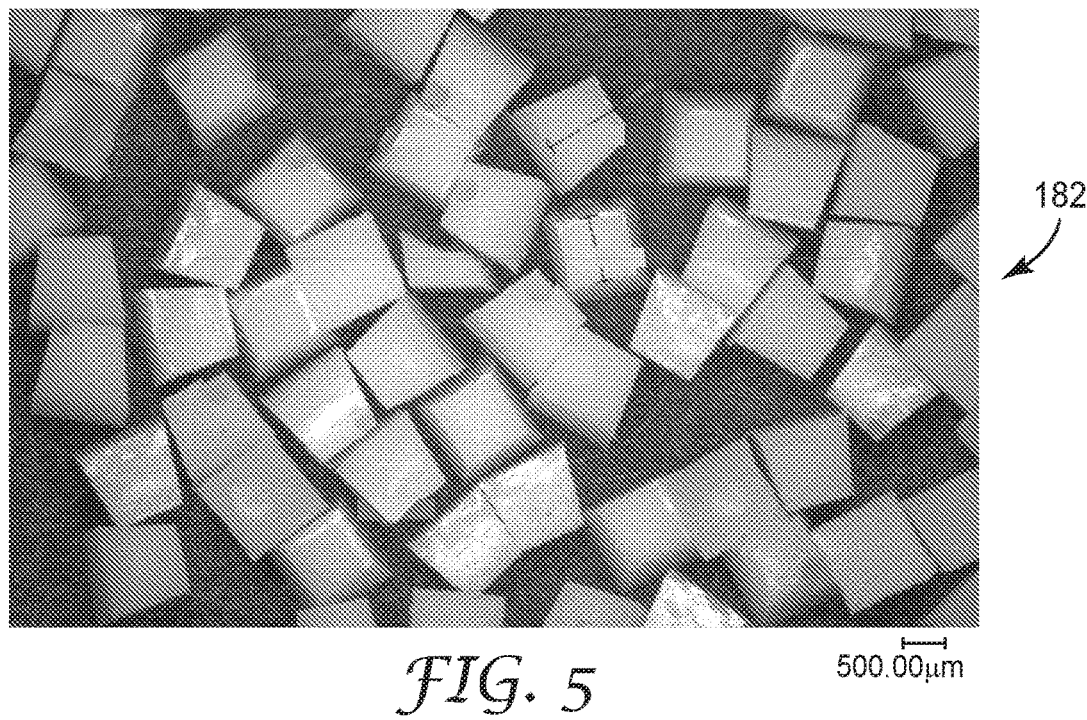
FIG. 5 illustrates sample spacer particles.

FIG. 5 illustrates sample spacer particles 182. In sample embodiments, the spacer particles 182 may comprise crushed or shaped abrasive particles and/or agglomerate grinding aid particles including grinding aid particles retained in a binder. The binder may be, for example, inorganic (e.g., vitreous binder or a dried inorganic sol) or, more typically, organic. In the case of crosslinked binders, the binders typically result from curing a corresponding binder precursor. Exemplary organic binders include pressure-sensitive adhesive binders, glues, and hot-melt adhesive binders. Exemplary pressure-sensitive adhesives include latex crepe, rosin, certain acrylic polymers and copolymers including polyacrylate esters (e.g., poly(butyl acrylate)) polyvinyl ethers (e.g., poly(vinyl n-butyl ether)), poly(alpha-olefins), silicones, alkyd adhesives, rubber adhesives (e.g., natural rubber, synthetic rubber, chlorinated rubber), and mixtures thereof. Exemplary thermosetting binder precursors include phenolic resins (e.g., resole resins and novolac resins), aminoplast resins, urea-formaldehyde resins, melamine-formaldehyde resins, one- and two-part polyurethanes, acrylic resins (e.g., acrylic monomers and oligomers, acrylated polyethers, aminoplast resins having pendant α,β-unsaturated groups, acrylated polyurethanes), epoxy resins (including bis-maleimide and fluorene-modified epoxy resins), isocyanurate resin, moisture-curable silicones, as well as mixtures thereof.

As used herein, a grinding aid is defined as particulate material, the addition of which to an abrasive article has a significant effect on the chemical and physical processes of abrading. In particular, the grinding aid will (1) decrease the friction between the abrasive particles and the workpiece being abraded, (2) prevent the abrasive particles from "capping", i.e., prevent metal particles from becoming welded to the tops of the abrasive particles, (3) decrease the interface temperature between the abrasive particles and the workpiece, or (4) decrease the grinding forces. In general, the addition of a grinding aid increases the useful life of the coated abrasive article. Grinding aids encompass a wide variety of different materials and can be inorganic or organic.

Exemplary grinding aids from which the spacer particles 182 may be formed include inorganic halide salts, halogenated compounds and polymers, and organic and inorganic sulfur-containing materials. Exemplary grinding aids, which may be organic or inorganic, include waxes, halogenated organic compounds such as chlorinated waxes like tetrachloronaphthalene, pentachloronaphthalene, and polyvinyl chloride; halide salts such as sodium chloride, potassium cryolite, sodium cryolite, ammonium cryolite, potassium tetrafluoroborate, sodium tetrafluoroborate, silicon fluorides, potassium chloride, magnesium chloride; and metals and their alloys such as tin, lead, bismuth, cobalt, antimony, cadmium, iron, and titanium. Examples of other grinding aids include sulfur, organic sulfur compounds, graphite, and metallic sulfides, organic and inorganic phosphate-containing materials. A combination of different grinding aids may be used.

Preferred grinding aids for use as the spacer particles 182 include halide salts, particularly potassium tetrafluoroborate ($KBF_4$), cryolite ($Na_3AlF_6$), and ammonium cryolite [$(NH_4)_3AlF_6$]. Other halide salts that can be used as grinding aids include sodium chloride, potassium cryolite, sodium tetrafluoroborate, silicon fluorides, potassium chloride, and magnesium chloride. Other preferred grinding aids are those in U.S. Pat. No. 5,269,821 (Helmin et al.), which describes grinding aid agglomerates comprised of water soluble and water insoluble grinding aid particles. Other useful grinding aid agglomerates are those wherein a plurality of grinding aid particles are bound together into an agglomerate with a binder. Agglomerates of this type are described in U.S. Pat. No. 5,498,268 (Gagliardi et al.).

Examples of halogenated polymers useful as grinding aids include polyvinyl halides (e.g., polyvinyl chloride) and polyvinylidene halides such as those disclosed in U.S. Pat. No. 3,616,580 (Dewell et al.); highly chlorinated paraffin waxes such as those disclosed in U.S. Pat. No. 3,676,092 (Buell); completely chlorinated hydrocarbons resins such as those disclosed in U.S. Pat. No. 3,784,365 (Caserta et al.); and fluorocarbons such as polytetrafluoroethylene and polytrifluorochloroethylene as disclosed in U.S. Pat. No. 3,869,834 (Mullin et al.).

Inorganic sulfur-containing materials useful as grinding aids include elemental sulfur, cupric sulfide, molybdenum sulfide, potassium sulfate, and the like, as variously disclosed in U.S. Pat. No. 3,833,346 (Wirth), U.S. Pat. No. 3,868,232 (Sioui et al.), and U.S. Pat. No. 4,475,926 (Hickory). Organic sulfur-containing materials (e.g., thiourea) for use as the spacer particles 182 include those mentioned in U.S. Pat. No. 3,058,819 (Paulson).

It is also within the scope of this disclosure to use a combination of different grinding aids as the spacer particles 182 and, in some instances, this may produce a synergistic effect. The above-mentioned examples of grinding aids is meant to be a representative showing of grinding aids, and it is not meant to encompass all grinding aids.

In some embodiments, the agglomerate grinding aid particles are free of abrasive particles; however, this is not a requirement.

Grinding aid particles included in the agglomerate grinding aid particles may have an average particle size ranging from about 1 micrometer to about 100 micrometers, and more preferably ranging from about 5 micrometers to about 50 micrometers, although other sizes may be used. As noted above, it is desired that the resultant spacer particles 182 formed from the grinding aid particles have a size whereby when the spacer particles 182 are deposited on the resin coated backing 150 the spacer particles 182 extend above the resin layer 154 to maintain a gap between the production tooling 210 and the resin coated backing 150 at the deposit point 190 for the shaped abrasive particles 220. The size of the gap and hence the size of the spacer particles 182 are thus dependent upon the size of the shaped abrasive particles 220 being using to manufacture the coated abrasive article 194. As illustrated in FIG. 5, sample spacer particles may be 1000-2000 microns.

Agglomerate grinding aid particles used as the spacer particles 182 may also comprise other components and/or additives, such as abrasive particles, fillers, diluents, fibers, lubricants, wetting agents, surfactants, pigments, dyes, coupling agents, plasticizers, antistatic agents, and suspending agents. Examples of fillers suitable for the spacer particles 182 include wood pulp, vermiculite, and combinations thereof, metal carbonates, such as calcium carbonate, e.g., chalk, calcite, marl, travertine, marble, and limestone, calcium magnesium carbonate, sodium carbonate, magnesium carbonate; silica, such as amorphous silica, quartz, glass beads, glass bubbles, and glass fibers; silicates, such as talc, clays (montmorillonite), feldspar, mica, calcium silicate, calcium metasilicate, sodium aluminosilicate, sodium silicate; metal sulfates, such as calcium sulfate, barium sulfate, sodium sulfate, aluminum sodium sulfate, aluminum sulfate; gypsum; vermiculite; wood flour; aluminum trihydrate; metal oxides, such as calcium oxide (lime), aluminum oxide, titanium dioxide, and metal sulfites, such as calcium sulfite.

Besides the gravity deposit techniques described herein with respect to the embodiments of FIGS. 1 and 4, agglomerate grinding aid particles can be disposed onto the make layer by various coating methods that are known in the art, including drop coating, individual placement (e.g., using a pick and place robot), and transfer coating using a tool having patterned cavities therein. In some embodiments, patterned drop coating can be achieved using an alignment tool by methods analogous to that described in PCT Pat. Appl. Publ. Nos. 2016/205133 (Wilson et al.), 2016/205267 (Wilson et al.), 2017/007703 (Wilson et al.), 2017/007714 (Liu et al.), except using agglomerate grinding aid particles in place of abrasive particles. Transfer coating using a tool having patterned cavities can be analogous to that described in U.S. Pat. Appln. Publ. No. 2016/0311081 A1 (Culler et al.), except using agglomerate grinding aid particles in place of abrasive particles. In some embodiments, agglomerate grinding aid particles can be applied onto the make layer through a patterned mesh or sieve.

In some embodiments, the agglomerate grinding aid particles may be graded according to a nominal screened grade using U.S.A. Standard Test Sieves conforming to ASTM E-11 "Standard Specification for Wire Cloth and Sieves for Testing Purposes". ASTM E-11 proscribes the requirements for the design and construction of testing sieves using a medium of woven wire cloth mounted in a frame for the classification of materials according to a designated particle size. A typical designation may be represented as −18+20 meaning that the agglomerate grinding aid particles pass through a test sieve meeting ASTM E-11 specifications for the number 18 sieve and are retained on a test sieve meeting ASTM E-11 specifications for the number 20 sieve. In one embodiment, the formed ceramic abrasive particles have a particle size such that most of the agglomerate grinding aid particles pass through an 18 mesh test sieve and are retained on a 20, 25, 30, 35, 40, 45, or 50 mesh test sieve. In various embodiments of the spacer particles 182, the formed ceramic abrasive particles can have a nominal screened grade comprising: −18+20, −20+25, −25+30, −30+35, −35+40, −40+45, −45+50, −50+60, −60+70, −70+80, −80+100, −100+120, −120+140, −140+170, −170+200, −200+230, −230+270, −270+3 25, −325+400, −400+450, −450+500, or −500+635.

A coated abrasive article 194 as described herein may include agglomerate grinding aid particles as spacer particles 182 arranged randomly, in a single predetermined pattern, or in multiple different patterns. At least a portion of the agglomerate grinding aid particles may be positioned such that a pattern formed by these agglomerate grinding aid particles includes a plurality of parallel lines and/or a grid pattern. As a further example, at least a portion of agglomerate grinding aid particles can be positioned such that a pattern formed by these agglomerate grinding aid particles includes a plurality of circles (hollow or filled). Likewise, at least a portion of agglomerate grinding aid particles may be arranged in a spiral, checkerboard, or striped (in any orientation).

Figure 6:
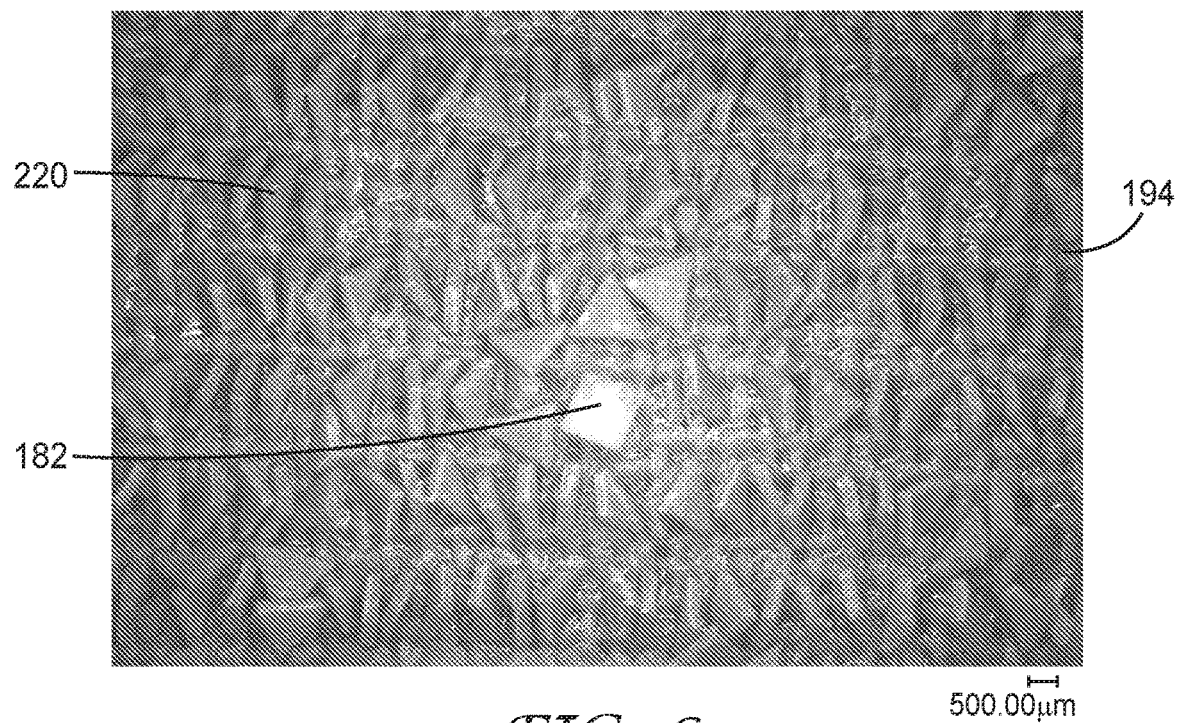
FIG. 6 illustrates a coated abrasive article having spacer particles deposited thereon in accordance with the method described herein.

Agglomerate grinding aid particles also may be disposed on a curable make layer precursor, followed by deposition of abrasive particles, and then at least partially curing of the make layer precursor to bond them. Due to the presence of the agglomerate grinding aid particles, at least a portion of the shaped abrasive particles 220 (and especially abrasive platelets) are deposited such that they contact at least one agglomerate grinding aid particle. As a result, at least some of the shaped abrasive particles 220 are disposed at an incline against respective agglomerate grinding aid particles in an outwardly raised orientation, and the amount so inclined will generally be greater than would be achieved by depositing a mixture of the shaped abrasive particles 220 and agglomerate grinding aid particles used as spacer particles 182 simultaneously. FIG. 6 illustrates a coated abrasive article 194 having spacer particles 182 deposited thereon in accordance with the method described herein.

Other than depositing the agglomerate grinding aid particles used as spacer particles 182 on the resin coated backing 150 or the production tooling 210 prior to depositing the shaped abrasive particles 220 during manufacture of the coated abrasive article 194, the process of making coated abrasive articles 194 may otherwise follow techniques known in the art. Details concerning manufacture of coated abrasive articles 194 can be found in, for example, U.S. Patent Publication No. 2016/0311081, to 3M Company, St. Paul MN, incorporated by reference above. Further details concerning coated abrasive discs comprising an abrasive layer secured to a backing, wherein the abrasive layer comprises abrasive particles and make, size, and optional supersize layers are well known, and may be found in, for example, U.S. Pat. No. 4,734,104 (Broberg); U.S. Pat. No. 4,737,163 (Larkey); U.S. Pat. No. 5,203,884 (Buchanan et al.); U.S. Pat. No. 5,152,917 (Pieper et al.); U.S. Pat. No. 5,378,251 (Culler et al.); U.S. Pat. No. 5,417,726 (Stout et al.); U.S. Pat. No. 5,436,063 (Follett et al.); U.S. Pat. No. 5,496,386 (Broberg et al.); U.S. Pat. No. 5,609,706 (Benedict et al.); U.S. Pat. No. 5,520,711 (Helmin); U.S. Pat. No. 5,954,844 (Law et al.); U.S. Pat. No. 5,961,674 (Gagliardi et al.); U.S. Pat. No. 4,751,138 (Bange et al.); U.S. Pat. No. 5,766,277 (DeVoe et al.); U.S. Pat. No. 6,077,601 (DeVoe et al.); U.S. Pat. No. 6,228,133 (Thurber et al.); and U.S. Pat. No. 5,975,988 (Christianson).

The shapes of the agglomerate grinding aid particles used as spacer particles 182 may be random or geometrically shaped. To improve the chance of beneficial orientation of the shaped abrasive particles 220, the spacer particles 182 are preferably shaped, more preferably precisely-shaped, with an aspect ratio of 3 or less, preferably less than 2, and more preferably less than 1.5, although this is not a requirement. In some preferred embodiments, the spacer particles 182 are precisely shaped and have a predetermined shape that is replicated from a mold cavity used to form an agglomerate grinding aid particle. In some of these embodiments, the shaped agglomerate grinding aid particles used as the spacer particles 182 have three-dimensional shapes such as pyramids (e.g., 3-, 4-, 5-, or 6-sided pyramids), cones, blocks, cubes, spheres, cylinders, rods, prisms (e.g., 3-, 4-, 5-, or 6-sided prisms), and truncated versions of these and the like. Preferably, at least one of the shaped agglomerate grinding aid particles according to the present disclosure is frustopyramidal, which may also be referred to as a truncated pyramid. In some embodiments, at least one of the agglomerate grinding aid particle or the agglomerate particle has a triangular frustopyramidal shape, a square frustopyramidal shape, or a hexagonal frustopyramidal shape. In some other embodiments, examples of useful shapes of the shaped agglomerate grinding aid particles include triangular, rectangular, square, pentagonal, and hexagonal prisms. Alternatively, the spacer particles 182 may be spherical in shape and formed of glass spheres or glass bubbles.

In sample embodiments, the spacer particles 182 are thus formed as shaped agglomerate grinding aid particles composed of grinding aid particles bound together by a binder. The abrasive particles, whether crushed or shaped, should have sufficient hardness and surface roughness to function as abrasive particles in an abrading process. Preferably, the abrasive particles have a Mohs hardness of at least 4, at least 5, at least 6, at least 7, or even at least 8.

Useful abrasive materials include, for example, fused aluminum oxide, heat treated aluminum oxide, white fused aluminum oxide, ceramic aluminum oxide materials such as those commercially available as 3M CERAMIC ABRASIVE GRAIN from 3M Company of St. Paul, Minnesota, black silicon carbide, green silicon carbide, titanium diboride, boron carbide, tungsten carbide, titanium carbide, cubic boron nitride, garnet, fused alumina zirconia, sol-gel derived ceramics (e.g., alumina ceramics doped with chromia, ceria, zirconia, titania, silica, and/or tin oxide), silica (e.g., quartz, glass beads, glass bubbles and glass fibers), feldspar, or flint. Examples of sol-gel derived crushed ceramic particles can be found in U.S. Pat. No. 4,314,827 (Leitheiser et al.), U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.).

On the other hand, the shaped abrasive particles 220 can be prepared, for example, by a molding process using sol-gel technology as described in U.S. Pat. No. 5,201,916 (Berg); U.S. Pat. No. 5,366,523 (Rowenhorst (Re 35,570)); and U.S. Pat. No. 5,984,988 (Berg). U.S. Pat. No. 8,034,137 (Erickson et al.) describes alumina particles that have been formed in a specific shape, then crushed to form shards that retain a portion of their original shape features. Exemplary shapes of abrasive particles include crushed, pyramids (e.g., 3-, 4-, 5-, or 6-sided pyramids), truncated pyramids (e.g., 3-, 4-, 5-, or 6-sided truncated pyramids), cones, truncated cones, rods (e.g., cylindrical, vermiform), and prisms (e.g., 3-, 4-, 5-, or 6-sided prisms).

The shaped abrasive particles 220 may be independently sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard). ANSI grade designations (i.e., specified nominal grades) include, for example: ANSI 4, ANSI 6, ANSI 8, ANSI 16, ANSI 24, ANSI 36, ANSI 46, ANSI 54, ANSI 60, ANSI 70, ANSI 80, ANSI 90, ANSI 100, ANSI 120, ANSI 150, ANSI 180, ANSI 220, ANSI 240, ANSI 280, ANSI 320, ANSI 360, ANSI 400, and ANSI 600. FEPA grade designations include F4, F5, F6, F7, F8, F10, F12, F14, F16, F20, F22, F24, F30, F36, F40, F46, F54, F60, F70, F80, F90, F100, F120, F150, F180, F220, F230, F240, F280, F320, F360, F400, F500, F600, F800, F1000, F1200, F1500, and F2000. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

Examples of shaped abrasive particles 220 can be found in U.S. Pat. No. 5,201,916 (Berg); U.S. Pat. No. 5,366,523 (Rowenhorst (Re 35,570)); and U.S. Pat. No. 5,984,988 (Berg). U.S. Pat. No. 8,034,137 (Erickson et al.) describes alumina crushed abrasive particles that have been formed in a specific shape, then crushed to form shards that retain a portion of their original shape features. In some embodiments, shaped alpha alumina particles are precisely-shaped (i.e., the particles have shapes that are at least partially determined by the shapes of cavities in a production tool used to make them. Details concerning such precisely-shaped abrasive particles and methods for their preparation can be found, for example, in U.S. Pat. No. 8,142,531 (Adefris et al.); U.S. Pat. No. 8,142,891 (Culler et al.); and U.S. Pat. No. 8,142,532 (Erickson et al.); and in U.S. Pat. Appl. Publ. Nos. 2012/0227333 (Adefris et al.); 2013/0040537 (Schwabel et al.); and 2013/0125477 (Adefris).

In embodiments where the shaped abrasive particles 220 are shaped as triangular platelets (or triangular frustopyramids), they may have a major surface with a vertex of 90 degrees (corresponding to a right triangle), or they may have a major surface with a vertex of greater than 90 degrees (corresponding to an obtuse triangle), although this is not a requirement. Examples include at least 91 degrees, at least 95 degrees, at least 100 degrees, at least 110 degrees, at least 120 degrees, or even at least 130 degrees.

In some preferred embodiments, the shaped abrasive particles 220 comprise platey crushed abrasive particles. Such abrasive particles can be obtained by known methods, from commercial suppliers, and/or by shape sorting such crushed abrasive particles; for example, using a shape-sorting table as is known in the art.

Examples of suitable shaped abrasive particles 220 include crushed abrasive particles comprising fused aluminum oxide, heat-treated aluminum oxide, white fused aluminum oxide, ceramic aluminum oxide materials such as those commercially available as 3M CERAMIC ABRASIVE GRAIN from 3M Company, St. Paul, Minnesota, brown aluminum oxide, blue aluminum oxide, silicon carbide (including green silicon carbide), titanium diboride, boron carbide, tungsten carbide, garnet, titanium carbide, diamond, cubic boron nitride, garnet, fused alumina zirconia, iron oxide, chromia, zirconia, titania, tin oxide, quartz, feldspar, flint, emery, sol-gel-derived ceramic (e.g., alpha alumina), and combinations thereof. Further examples include crushed abrasive composites of abrasive particles (which may be platey or not) in a binder matrix, such as those described in U.S. Pat. No. 5,152,917 (Pieper et al.). Many such abrasive particles, agglomerates, and composites are known in the art.

Preferably, crushed abrasive particles comprise ceramic crushed abrasive particles such as, for example, sol-gel-derived polycrystalline alpha alumina particles. Ceramic crushed abrasive particles composed of crystallites of alpha alumina, magnesium alumina spinel, and a rare earth hexagonal aluminate may be prepared using sol-gel precursor alpha alumina particles according to methods described in, for example, U.S. Pat. No. 5,213,591 (Celikkaya et al.) and U.S. Publ. Pat. Appln. Nos. 2009/0165394 A1 (Culler et al.) and 2009/0169816 A1 (Erickson et al.).

Examples of sol-gel-derived abrasive particles from which crushed abrasive particles can be isolated, and methods for their preparation can be found, in U.S. Pat. No. 4,314,827 (Leitheiser et al.); U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.). It is also contemplated that the crushed abrasive particles could comprise abrasive agglomerates such as, for example, as those described in U.S. Pat. No. 4,652,275 (Bloecher et al.) or U.S. Pat. No. 4,799,939 (Bloecher et al.). In some embodiments, the crushed abrasive particles may be surface-treated with a coupling agent (e.g., an organosilane coupling agent) or other physical treatment (e.g., iron oxide or titanium oxide) to enhance adhesion of the crushed abrasive particles to a binder. The crushed abrasive particles may be treated before combining them with the binder, or they may be surface treated in situ by including a coupling agent to the binder.

Further details concerning methods of making sol-gel-derived abrasive particles can be found in, for example, U.S. Pat. No. 4,314,827 (Leitheiser); U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.); and in U.S. Publ. Pat. Appln. No. 2009/0165394 A1 (Culler et al.).

Surface coatings on the various shaped abrasive particles 220 may be used to improve the adhesion between the abrasive particles and a binder in abrasive articles or can be used to aid in electrostatic deposition. In one embodiment, surface coatings as described in U.S. Pat. No. 5,352,254 (Celikkaya) in an amount of 0.1 to 2 percent surface coating to abrasive particle weight may be used. Such surface coatings are described in U.S. Pat. No. 5,213,591 (Celikkaya et al.); U.S. Pat. No. 5,011,508 (Wald et al.); U.S. Pat. No. 1,910,444 (Nicholson); U.S. Pat. No. 3,041,156 (Rowse et al.); U.S. Pat. No. 5,009,675 (Kunz et al.); U.S. Pat. No. 5,085,671 (Martin et al.); U.S. Pat. No. 4,997,461 (Markhoff-Matheny et al.); and U.S. Pat. No. 5,042,991 (Kunz et al.). Additionally, the surface coating may prevent the shaped abrasive particle 220 from capping. Capping is the term to describe the phenomenon where metal particles from the workpiece being abraded become welded to the tops of the crushed abrasive particles. Surface coatings to perform the above functions are known to those of skill in the art.

Also, it will be appreciated that the shaped abrasive particles 220 described herein can be formed in many suitable ways. For example, the shaped abrasive particles 220 can be made according to a multi-operation process. The process can be carried out using any material or precursor dispersion material. Briefly, for embodiments where the shaped abrasive particles 220 are monolithic ceramic particles, the process can include the operations of making either a seeded or non-seeded precursor dispersion that can be converted into a corresponding (e.g., a boehmite sol-gel that can be converted to alpha alumina); filling one or more mold cavities having the desired outer shape of shaped abrasive particles 220 with a precursor dispersion; drying the precursor dispersion to form precursor shaped abrasive particle 220; removing the precursor shaped abrasive particles 220 from the mold cavities; calcining the precursor shaped abrasive particles 220 to form calcined, precursor shaped abrasive particles 220; and then sintering the calcined, precursor shaped abrasive particles 220 to form shaped abrasive particles 220. The process will now be described in greater detail in the context of alpha-alumina-containing shaped abrasive particles 220. In other embodiments, the mold cavities may be filled with a melamine to form melamine shaped abrasive particles 220.

The process can include the operation of providing either a seeded or non-seeded dispersion of a precursor that can be converted into ceramic. In examples where the precursor is seeded, the precursor can be seeded with an oxide of an iron (e.g., FeO). The precursor dispersion can include a liquid that is a volatile component. In one example, the volatile component is water. The dispersion can include a sufficient amount of liquid for the viscosity of the dispersion to be sufficiently low to allow filling mold cavities and replicating the mold surfaces, but not so much liquid as to cause subsequent removal of the liquid from the mold cavity to be prohibitively expensive. In one example, the precursor dispersion includes from 2 percent to 90 percent by weight of the particles that can be converted into ceramic, such as particles of aluminum oxide monohydrate (boehmite), and at least 10 percent by weight, or from 50 percent to 70 percent, or 50 percent to 60 percent, by weight, of the volatile component such as water. Conversely, the precursor dispersion in some embodiments contains from 30 percent to 50 percent, or 40 percent to 50 percent solids by weight.

Examples of suitable precursor dispersions include zirconium oxide sols, vanadium oxide sols, cerium oxide sols, aluminum oxide sols, and combinations thereof. Suitable aluminum oxide dispersions include, for example, boehmite dispersions and other aluminum oxide hydrates dispersions. Boehmite can be prepared by known techniques or can be obtained commercially. Examples of commercially available boehmite include products having the trade designations "DISPERAL" and "DISPAL", both available from Sasol North America, Inc., or "HIQ-40" available from BASF Corporation. These aluminum oxide monohydrates are relatively pure; that is, they include relatively little, if any, hydrate phases other than monohydrates, and have a high surface area.

The physical properties of the resulting shaped abrasive particles 220 can generally depend upon the type of material used in the precursor dispersion. As used herein, a "gel" is a three-dimensional network of solids dispersed in a liquid.

The precursor dispersion can contain a modifying additive or precursor of a modifying additive. The modifying additive can function to enhance some desirable property of the shaped abrasive particles 220 or increase the effectiveness of the subsequent sintering step. Modifying additives or precursors of modifying additives can be in the form of soluble salts, such as water-soluble salts. They can include a metal-containing compound and can be a precursor of an oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the precursor dispersion can be varied.

The introduction of a modifying additive or precursor of a modifying additive can cause the precursor dispersion to gel. The precursor dispersion can also be induced to gel by application of heat over a period of time to reduce the liquid content in the dispersion through evaporation. The precursor dispersion can also contain a nucleating agent. Nucleating agents suitable for this disclosure can include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina.

A peptizing agent can be added to the precursor dispersion to produce a more stable hydrosol or colloidal precursor dispersion. Suitable peptizing agents are monoprotic acids or acid compounds such as acetic acid, hydrochloric acid, formic acid, and nitric acid. Multiprotic acids can also be used, but they can rapidly gel the precursor dispersion, making it difficult to handle or to introduce additional components. Some commercial sources of boehmite contain an acid titer (such as absorbed formic or nitric acid) that will assist in forming a stable precursor dispersion.

The precursor dispersion can be formed by any suitable means; for example, in the case of a sol-gel alumina precursor, it can be formed by simply mixing aluminum oxide monohydrate with water containing a peptizing agent or by forming an aluminum oxide monohydrate slurry to which the peptizing agent is added.

Defoamers or other suitable chemicals can be added to reduce the tendency to form bubbles or entrain air while mixing. Additional chemicals such as wetting agents, alcohols, or coupling agents can be added if desired.

A further operation can include providing a mold having at least one mold cavity, or a plurality of cavities formed in at least one major surface of the mold. In some examples, the mold is formed as a production tooling, which can be, for example, a belt, a sheet, a continuous web, a coating roll such as a rotogravure roll, a sleeve mounted on a coating roll, or a die. In one example, the production tooling can include polymeric material. Examples of suitable polymeric materials include thermoplastics such as polyesters, polycarbonates, poly(ether sulfone), poly(methyl methacrylate), polyurethanes, polyvinylchloride, polyolefin, polystyrene, polypropylene, polyethylene or combinations thereof, or thermosetting materials. In one example, the entire production tooling is made from a polymeric or thermoplastic material. In another example, the surfaces of the tooling in contact with the precursor dispersion while the precursor dispersion is drying, such as the surfaces of the plurality of cavities, include polymeric or thermoplastic materials, and other portions of the tooling can be made from other materials. A suitable polymeric coating can be applied to a metal tooling to change its surface tension properties, by way of example.

A polymeric or thermoplastic production tooling can be replicated off a metal master tool. The master tool can have the inverse pattern of that desired for the production tooling. The master tool can be made in the same manner as the production tooling. In one example, the master tool is made of metal (e.g., nickel) and is diamond-turned. In one example, the master tool is at least partially formed using stereolithography. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tooling. If a thermoplastic production tooling is utilized, then care should be taken not to generate excessive heat that can distort the thermoplastic production tooling, limiting its life.

Access to cavities can be from an opening in the top surface or bottom surface of the mold. In some examples, the cavities can extend for the entire thickness of the mold. Alternatively, the cavities can extend only for a portion of the thickness of the mold. In one example, the top surface is substantially parallel to the bottom surface of the mold with the cavities having a substantially uniform depth. At least one side of the mold, the side in which the cavities are formed, can remain exposed to the surrounding atmosphere during the step in which the volatile component is removed.

The cavities have a specified three-dimensional shape to make shaped abrasive particles 220. The depth dimension is equal to the perpendicular distance from the top surface to the lowermost point on the bottom surface. The depth of a given cavity can be uniform or can vary along its length and/or width. The cavities of a given mold can be of the same shape or of different shapes.

A further operation involves filling the cavities in the mold with the precursor dispersion (e.g., by a conventional technique). In some examples, a knife roll coater or vacuum slot die coater can be used. A mold release agent can be used to aid in removing the shaped abrasive particles 220 from the mold if desired. Examples of mold release agents include oils such as peanut oil or mineral oil, fish oil, silicones, polytetrafluoroethylene, zinc stearate, and graphite. In general, a mold release agent such as peanut oil, in a liquid, such as water or alcohol, is applied to the surfaces of the production tooling in contact with the precursor dispersion such that from about 0.1 mg/in$^2$ (0.6 mg/cm$^2$) to about 3.0 mg/in$^2$ (20 mg/cm$^2$), or from about 0.1 mg/in$^2$ (0.6 mg/cm$^2$) to about 5.0 mg/in$^2$ (30 mg/cm$^2$), of the mold release agent is present per unit area of the mold when a mold release is desired. In some embodiments, the top surface of the mold is coated with the precursor dispersion. The precursor dispersion can be pumped onto the top surface.

In a further operation, a scraper or leveler bar can be used to force the precursor dispersion fully into the cavity of the mold. The remaining portion of the precursor dispersion that does not enter the cavity can be removed from the top surface of the mold and recycled. In some examples, a small portion of the precursor dispersion can remain on the top surface, and in other examples the top surface is substantially free of the dispersion. The pressure applied by the scraper or leveler bar can be less than 100 psi (0.6 MPa), or less than 50 psi (0.3 MPa), or even less than 10 psi (60 kPa). In some examples, no exposed surface of the precursor dispersion extends substantially beyond the top surface.

In those examples where it is desired to have the exposed surfaces of the cavities result in planar faces of the shaped abrasive particles 220, it can be desirable to overfill the cavities (e.g., using a micronozzle array) and slowly dry the precursor dispersion.

A further operation involves removing the volatile component to dry the dispersion. The volatile component can be removed by fast evaporation rates. In some examples, removal of the volatile component by evaporation occurs at temperatures above the boiling point of the volatile component. An upper limit to the drying temperature often depends on the material the mold is made from. For polypropylene tooling, the temperature should be less than the melting point of the plastic. In one example, for a water dispersion of from about 40 to 50 percent solids and a polypropylene mold, the drying temperatures can be from about 90° C. to about 165° C., or from about 105° C. to about 150° C., or from about 105° C. to about 120° C. Higher temperatures can lead to improved production speeds but can also lead to degradation of the polypropylene tooling, limiting its useful life as a mold.

During drying, the precursor dispersion shrinks, often causing retraction from the cavity walls. For example, if the cavities have planar walls, then the resulting shaped abrasive particles 220 can tend to have at least three concave major sides. It is presently discovered that by making the cavity walls concave (whereby the cavity volume is increased) it is possible to obtain shaped abrasive particles 220 that have at least three substantially planar major sides. The degree of concavity generally depends on the solids content of the precursor dispersion.

A further operation involves removing resultant precursor shaped abrasive particles 220 from the mold cavities. The precursor shaped abrasive particles 220 can be removed from the cavities by using the following processes alone or in combination on the mold: gravity, vibration, ultrasonic vibration, vacuum, or pressurized air to remove the shaped abrasive particles 220 from the mold cavities.

The precursor shaped abrasive particles 220 can be further dried outside of the mold. If the precursor dispersion is dried to the desired level in the mold, this additional drying step is not necessary. However, in some instances it can be economical to employ this additional drying step to minimize the time that the precursor dispersion resides in the mold. The precursor shaped abrasive particles 220 will be dried from 10 to 480 minutes, or from 120 to 400 minutes, at a temperature from 50° C. to 160° C., or 120° C. to 150° C.

A further operation involves calcining the precursor shaped abrasive particles 220. During calcining, essentially all the volatile material is removed, and the various components that were present in the precursor dispersion are transformed into metal oxides. The precursor shaped abrasive particles 220 are generally heated to a temperature from 400° C. to 800° C. and maintained within this temperature range until the free water and over 90 percent by weight of any bound volatile material are removed. In an optional step, it can be desirable to introduce the modifying additive by an impregnation process. A water-soluble salt can be introduced by impregnation into the pores of the calcined, precursor shaped abrasive particles 220. Then the precursor shaped abrasive particles 220 are pre-fired again.

A further operation can involve sintering the calcined, precursor shaped abrasive particles 220. In some examples where the precursor includes rare earth metals, however, sintering may not be necessary. Prior to sintering, the calcined, precursor shaped abrasive particles 220 are not completely densified and thus lack the desired hardness to be used as shaped abrasive particles 220. Sintering takes place by heating the calcined, precursor shaped abrasive particles 220 to a temperature of from 1000° C. to 1650° C. The length of time for which the calcined, precursor shaped abrasive particles 220 can be exposed to the sintering temperature to achieve this level of conversion depends upon various factors, but from five seconds to 48 hours is possible.

In another embodiment, the duration of the sintering step ranges from one minute to 90 minutes. After sintering, the shaped abrasive particles 220 can have a Vickers hardness of 10 GPa (gigaPascals), 16 GPa, 18 GPa, 20 GPa, or greater.

Additional operations can be used to modify the described process, such as, for example, rapidly heating the material from the calcining temperature to the sintering temperature, and centrifuging the precursor dispersion to remove sludge and/or waste. Moreover, the process can be modified by combining two or more of the process steps if desired.

The coated abrasive article 194 produced using the methods and apparatus described herein includes the resin coated backing 150 defining a surface along an x-y direction. In sample embodiments, the resin coated backing 150 has a first layer of binder 154, described herein as make coat, that is applied over a first surface of a backing layer 152 of the resin coated backing 150. Attached or partially embedded in the make coat are the plurality of shaped abrasive particles 220 formed as described above. Although shaped abrasive particles 220 are shown, any other shaped abrasive particle 220 described herein can be included in coated abrasive article 194. An optional second layer of binder or size coat may be dispersed over shaped abrasive particles 220. The shaped abrasive particles 220 are oriented according to a non-random distribution, although in other embodiments the shaped abrasive particles 220 can be randomly oriented on the resin coated backing 150. In some embodiments, control of a particle's orientation can increase the cut of the abrasive article.

In sample embodiments, the resin coated backing 150 can be flexible or rigid. Examples of suitable materials for forming a flexible backing 152 include a polymeric film, a metal foil, a woven fabric, a knitted fabric, paper, vulcanized fiber, a staple fiber, a continuous fiber, a nonwoven, a foam, a screen, a laminate, and combinations thereof. The resin coated backing 150 can be shaped to allow the coated abrasive article 194 to be in the form of sheets, discs, belts, pads, or rolls. In some embodiments, the resin coated backing 150 can be sufficiently flexible to allow coated abrasive article 194 to be formed into a loop to make an abrasive belt that can be run on suitable grinding equipment.

The make coat secures the shaped abrasive particles 220 to the resin coated backing 150, and the size coat can help to reinforce shaped abrasive particles 220. The make coat and/or size coat can include a resinous adhesive. The resinous adhesive can include one or more resins chosen from a phenolic resin, an epoxy resin, a urea-formaldehyde resin, an acrylate resin, an aminoplast resin, a melamine resin, an acrylated epoxy resin, a urethane resin, a polyester resin, a dying oil, and mixtures thereof.

Although shaped abrasive particles 220 can be randomly distributed, it is also possible to distribute shaped abrasive particles 220 according to a predetermined pattern, as noted above. For example, adjacent shaped abrasive particles 220 of a first layer may be directly aligned with each other in rows or directly aligned in concentric circles. Alternatively, adjacent shaped abrasive particles 220 can be staggered with respect to each other. Additional predetermined patterns of shaped abrasive particles 220 are also within the scope of this disclosure. For example, shaped abrasive particles 220 can be arranged in a pattern that forms a word or image. Shaped abrasive particles 220 can also be arranged in a pattern that forms an image when the coated abrasive article 194 is rotated at a predetermined speed. In addition to, or instead of, shaped abrasive particles 220 being arranged in a predetermined pattern, other particles such as filler particles can also be arranged in a predetermined pattern as described with respect to the shaped abrasive particles 220.

It will be further appreciated that the coated abrasive article 194 can also include conventional (e.g., crushed) abrasive particles. Examples of useful abrasive particles include fused aluminum oxide—based materials such as aluminum oxide, ceramic aluminum oxide (which can include one or more metal oxide modifiers and/or seeding or nucleating agents), and heat-treated aluminum oxide, silicon carbide, co-fused alumina-zirconia, diamond, ceria, titanium diboride, cubic boron nitride, boron carbide, garnet, flint, emery, sol-gel derived abrasive particles, and mixtures thereof.

The conventional abrasive particles can, for example, have an average diameter ranging from about 10 μm to about 2000 μm, about 20 μm to about 1300 μm, about 50 μm to about 1000 μm, less than, equal to, or greater than about 10 μm, 20, 30, 40, 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1650, 1700, 1750, 1800, 1850, 1900, 1950, or 2000 μm. For example, the conventional abrasive particles can have an abrasives industry-specified nominal grade. Such abrasives industry-accepted grading standards include those known as the American National Standards Institute, Inc. (ANSI) standards, Federation of European Producers of Abrasive Products (FEPA) standards, and Japanese Industrial Standard (HS) standards. Exemplary ANSI grade designations (e.g., specified nominal grades) include: ANSI 12 (1842 μm), ANSI 16 (1320 μm), ANSI 20 (905 μm), ANSI 24 (728 μm), ANSI 36 (530 μm), ANSI 40 (420 μm), ANSI 50 (351 μm), ANSI 60 (264 μm), ANSI 80 (195 μm), ANSI 100 (141 μm), ANSI 120 (116 μm), ANSI 150 (93 μm), ANSI 180 (78 μm), ANSI 220 (66 μm), ANSI 240 (53 μm), ANSI 280 (44 μm), ANSI 320 (46 μm), ANSI 360 (30 μm), ANSI 400 (24 μm), and ANSI 600 (16 μm). Exemplary FEPA grade designations include P12 (1746 μm), P16 (1320 μm), P20 (984 μm), P24 (728 μm), P30 (630 μm), P36 (530 μm), P40 (420 μm), P50 (326 μm), P60 (264 μm), P80 (195 μm), P100 (156 μm), P120 (127 μm), P120 (127 μm), P150 (97 μm), P180 (78 μm), P220 (66 μm), P240 (60 μm), P280 (53 μm), P320 (46 μm), P360 (41 μm), P400 (36 μm), P500 (30 μm), P600 (26 μm), and P800 (22 μm). An approximate average particles size of reach grade is listed in parenthesis following each grade designation.

Shaped abrasive particles 220 or crushed abrasive particles can include any suitable material or mixture of materials. For example, shaped abrasive particles 220 can include a material chosen from an alpha-alumina, a fused aluminum oxide, a heat-treated aluminum oxide, a ceramic aluminum oxide, a sintered aluminum oxide, a silicon carbide, a titanium diboride, a boron carbide, a tungsten carbide, a titanium carbide, a diamond, a cubic boron nitride, a garnet, a fused alumina-zirconia, a sol-gel derived abrasive particle, a cerium oxide, a zirconium oxide, a titanium oxide, and combinations thereof. In some embodiments, shaped abrasive particles 220 and crushed abrasive particles can include the same materials. In further embodiments, shaped abrasive particles 220 and crushed abrasive particles can include different materials.

Filler particles can also be included in the coated abrasive articles 194. Examples of useful fillers include metal carbonates (such as calcium carbonate, calcium magnesium carbonate, sodium carbonate, magnesium carbonate), silica (such as quartz, glass beads, glass bubbles and glass fibers), silicates (such as talc, clays, montmorillonite, feldspar, mica, calcium silicate, calcium metasilicate, sodium aluminosilicate, sodium silicate), metal sulfates (such as calcium sulfate, barium sulfate, sodium sulfate, aluminum sodium sulfate, aluminum sulfate), gypsum, vermiculite, sugar, wood flour, a hydrated aluminum compound, carbon black, metal oxides (such as calcium oxide, aluminum oxide, tin oxide, titanium dioxide), metal sulfites (such as calcium sulfite), thermoplastic particles (such as polycarbonate, polyetherimide, polyester, polyethylene, poly(vinylchloride), polysulfone, polystyrene, acrylonitrile-butadiene-styrene block copolymer, polypropylene, acetal polymers, polyurethanes, nylon particles) and thermosetting particles (such as phenolic bubbles, phenolic beads, polyurethane foam particles and the like). The filler may also be a salt such as a halide salt. Examples of halide salts include sodium chloride, potassium cryolite, sodium cryolite, ammonium cryolite, potassium tetrafluoroborate, sodium tetrafluoroborate, silicon fluorides, potassium chloride, magnesium chloride. Examples of metal fillers include, tin, lead, bismuth, cobalt, antimony, cadmium, iron and titanium. Other miscellaneous fillers include sulfur, organic sulfur compounds, graphite, lithium stearate and metallic sulfides. In some embodiments, individual shaped abrasive particles 220 or individual crushed abrasive particles can be at least partially coated with an amorphous, ceramic, or organic coating. Examples of suitable components of the coatings include, a silane, glass, iron oxide, aluminum oxide, or combinations thereof. Coatings such as these can aid in processability and bonding of the particles to a resin of a binder.

In other embodiments, the shaped abrasive particles 220 can include a polymeric material and can be characterized as soft abrasive particles. The soft shaped abrasive particles described herein can independently include any suitable material or combination of materials. For example, the soft shaped abrasive particles can include a reaction product of a polymerizable mixture including one or more polymerizable resins. The one or more polymerizable resins such as a hydrocarbyl polymerizable resin. Examples of such resins include those chosen from a phenolic resin, a urea formaldehyde resin, a urethane resin, a melamine resin, an epoxy resin, a bismaleimide resin, a vinyl ether resin, an aminoplast resin (which may include pendant alpha, beta unsaturated carbonyl groups), an acrylate resin, an acrylated isocyanurate resin, an isocyanurate resin, an acrylated urethane resin, an acrylated epoxy resin, an alkyl resin, a polyester resin, a drying oil, or mixtures thereof. The polymerizable mixture can include additional components such as a plasticizer, an acid catalyst, a cross-linker, a surfactant, a mild-abrasive, a pigment, a catalyst and an antibacterial agent.

Where multiple components are present in the polymerizable mixture, those components can account for any suitable weight percentage of the mixture. For example, the polymerizable resin or resins, may be in a range of from about 35 wt % to about 99.9 wt % of the polymerizable mixture, about 40 wt % to about 95 wt %, or less than, equal to, or greater than about 35 wt %, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or about 99.9 wt %.

If present, the cross-linker may be in a range of from about 2 wt % to about 60 wt % of the polymerizable mixture, from about 5 wt % to about 10 wt %, or less than, equal to, or greater than about 2 wt %, 3, 4, 5, 6, 7, 8, 9, 10, 11, 12, 13, 14, or about 15 wt %. Examples of suitable cross-linkers include a cross-linker available under the trade designation CYMEL 303 LF, of Allnex USA Inc., Alpharetta, Georgia, USA; or a cross-linker available under the trade designation CYMEL 385, of Allnex USA Inc., Alpharetta, Georgia, USA.

If present, the mild-abrasive may be in a range of from about 5 wt % to about 65 wt % of the polymerizable mixture, about 10 wt % to about 20 wt %, or less than, equal to, or greater than about 5 wt %, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or about 65 wt %. Examples of suitable mild-abrasives include a mild-abrasive available under the trade designation MINSTRON 353 TALC, of Imerys Talc America, Inc., Three Forks, Montana, USA; a mild-abrasive available under the trade designation USG TERRA ALBA NO.1 CALCIUM SULFATE, of USG Corporation, Chicago, Illinois, USA; Recycled Glass (40-70 Grit) available from ESCA Industries, Ltd., Hatfield, Pennsylvania, USA, silica, calcite, nepheline, syenite, calcium carbonate, or mixtures thereof.

If present, the plasticizer may be in a range of from about 5 wt % to about 40 wt % of the polymerizable mixture, about 10 wt % to about 15 wt %, or less than, equal to, or greater than about 5 wt %, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or about 40 wt %. Examples of suitable plasticizers include acrylic resins or styrene butadiene resins. Examples of acrylic resins include an acrylic resin available under the trade designation RHOPLEX GL-618, of DOW Chemical Company, Midland, Michigan, USA; an acrylic resin available under the trade designation HYCAR 2679, of the Lubrizol Corporation, Wickliffe, Ohio, USA; an acrylic resin available under the trade designation HYCAR 26796, of the Lubrizol Corporation, Wickliffe, Ohio, USA; a polyether polyol available under the trade designation ARCOL LG-650, of DOW Chemical Company, Midland, Michigan, USA; or an acrylic resin available under the trade designation HYCAR 26315, of the Lubrizol Corporation, Wickliffe, Ohio, USA. An example of a styrene butadiene resin includes a resin available under the trade designation ROVENE 5900, of Mallard Creek Polymers, Inc., Charlotte, North Carolina, USA.

If present, the acid catalyst may be in a range of from 0.5 wt % to about 20 wt % of the polymerizable mixture, about 5 wt % to about 10 wt %, or less than, equal to, or greater than about 1 wt %, 2, 3, 4, 5, 6, 7, 8, 9, 10, 11, 12, 13, 14, 15, 16, 17, 18, 19, or about 20 wt %. Examples of suitable acid catalysts include a solution of aluminum chloride or a solution of ammonium chloride.

If present, the surfactant can be in a range of from about 0.001 wt % to about 15 wt % of the polymerizable mixture about 5 wt % to about 10 wt %, less than, equal to, or greater than about 0.001 wt %, 0.01, 0.5, 1, 2, 3, 4, 5, 6, 7, 8, 9, 10, 11, 12, 13, 14, or about 15 wt %. Examples of suitable surfactants include a surfactant available under the trade designation GEMTEX SC-85-P, of Innospec Performance Chemicals, Salisbury, North Carolina, USA; a surfactant available under the trade designation DYNOL 604, of Air Products and Chemicals, Inc., Allentown, Pennsylvania, USA; a surfactant available under the trade designation ACRYSOL RM-8W, of DOW Chemical Company, Midland, Michigan, USA; or a surfactant available under the trade designation XIAMETER AFE 1520, of DOW Chemical Company, Midland, Michigan, USA.

If present, the antimicrobial agent may be in a range of from 0.5 wt % to about 20 wt % of the polymerizable mixture, about 10 wt % to about 15 wt %, or less than, equal to, or greater than about 0.5 wt %, 1, 2, 3, 4, 5, 6, 7, 8, 9, 10, 11, 12, 13, 14, 15, 16, 17, 18, 19, or about 20 wt %. An example of a suitable antimicrobial agent includes zinc pyrithione.

If present, the pigment may be in a range of from about 0.1 wt % to about 10 wt % of the polymerizable mixture, about 3 wt % to about 5 wt %, less than, equal to, or greater than about 0.1 wt %, 0.2, 0.4, 0.6, 0.8, 1, 1.5, 2, 2.5, 3, 3.5, 4, 4.5, 5, 5.5, 6, 6.5, 7, 7.5, 8, 8.5, 9, 9.5, or about 10 wt %. Examples of suitable pigments include a pigment dispersion available under the trade designation SUNSPERSE BLUE 15, of Sun Chemical Corporation, Parsippany, New Jersey, USA; a pigment dispersion available under the trade designation SUNSPERSE VIOLET 23, of Sun Chemical Corporation, Parsippany, New Jersey, USA; a pigment dispersion available under the trade designation SUN BLACK, of Sun Chemical Corporation, Parsippany, New Jersey, USA; or a pigment dispersion available under the trade designation BLUE PIGMENT B2G, of Clariant Ltd., Charlotte, North Carolina, USA. The mixture of components can be polymerized by curing.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure.

The above-presented description and figures are intended by way of example only and are not intended to limit the illustrative embodiments in any way except as set forth in the appended claims. It is noted that various technical aspects of the various elements of the various exemplary embodiments that have been described above can be combined in numerous other ways, all of which are considered to be within the scope of the disclosure.

For example, although coated abrasive article maker apparatus 100 and 400 is shown and described herein as including a production tooling 210 in the form of an endless belt, it is possible in some alternative embodiments for the coated abrasive article maker apparatus 100 or 400 to include production tooling 210 on the vacuum pull roll 120. For example, vacuum pull roll 120 could include a plurality of cavities 230 to which shaped abrasive particles 220 are directly fed. Shaped abrasive particles 220 would be selectively held in place with a vacuum, which can be disengaged to release the shaped abrasive particles 220 onto the resin coated backing 150. Further details of the coated abrasive article maker apparatus 100 and 400 and suitable alternatives may be found in U.S. Patent Publication No. 2016/0311081 incorporated by reference above.

Accordingly, although exemplary embodiments have been disclosed for illustrative purposes, those skilled in the art will appreciate that various modifications, additions, and substitutions are possible. Therefore, the disclosure is not limited to the above-described embodiments but may be modified within the scope of appended claims, along with their full scope of equivalents.

What is claimed is:
1. A coated abrasive article maker apparatus comprising:
   a production tool having a dispensing surface with a plurality of cavities;
   at least one roller that guides the production tool through the coated abrasive article maker apparatus, the at least one roller including at least one drive roll for pulling the production tool in a direction of travel;

an abrasive particle feeder positioned adjacent the production tool so as to dispense shaped abrasive particles onto the dispensing surface and into the plurality of cavities of the production tool;

a resin coated backing sheet feeder that guides a resin coated backing sheet through the coated abrasive article maker apparatus in the direction of travel, the resin coated backing sheet positioned to receive shaped abrasive particles from the plurality of cavities of the production tool at a deposit point; and a spacer particle feeder positioned to dispense spacer particles onto at least one of the resin coated backing sheet in the direction of travel and the production tool after the abrasive particle feeder in the direction of travel prior to the deposit point, wherein the spacer particles have a thickness that is greater than a thickness of a resin coating of the resin coated backing sheet and a thickness and density once dispensed on the resin coated backing sheet that are sufficient to substantially prevent the production tool from contacting the resin coated backing sheet at the deposit point.

2. An apparatus as in claim 1, wherein the spacer particle feeder dispenses the spacer particles onto at least one of the resin coated backing sheet and the production tool in a predetermined pattern.

3. An apparatus as in claim 1, wherein the spacer particles are friable.

4. An apparatus as in claim 1, wherein the spacer particles comprise at least one of an abrasive particle, an abrasive agglomerate, and a grinding aid.

5. An apparatus as in claim 1, wherein the spacer particles are at least one of square and trapezoidal in shape.

6. An apparatus as in claim 5, wherein the spacer particles have sloped sidewalls.

7. An apparatus as in claim 1, wherein the spacer particles are spherical in shape.

8. An apparatus as in claim 7, wherein the spacer particles are glass spheres or glass bubbles.

9. An apparatus as in claim 1, wherein the spacer particles are made of a material that melts or evaporates at elevated temperatures above ambient room temperature.

10. A method of making coated abrasive articles comprising:

providing a production tool having a dispensing surface with a plurality of cavities;

guiding the production tool in a direction of travel past an abrasive particle feeder;

dispensing shaped abrasive particles onto the dispensing surface and into the plurality of cavities of the production tool;

guiding a resin coated backing sheet adjacent the production tool in the direction of travel past a spacer particle feeder;

dispensing spacer particles onto at least one of the resin coated backing sheet in the direction of travel and the production tool after the abrasive particle feeder in the direction of travel prior to a deposit point, wherein the spacer particles have a thickness that is greater than a thickness of a resin coating of the resin coated backing sheet and a thickness and density once dispensed on the resin coated backing sheet that are sufficient to substantially prevent the production tool from contacting the resin coated backing sheet at the deposit point; and providing shaped abrasive particles from the plurality of cavities of the production tool onto the resin coated backing sheet at the deposit point.

11. A method as in claim 10, wherein dispensing spacer particles comprises dispensing the spacer particles onto at least one of the resin coated backing sheet and the production tool in a predetermined pattern.

12. A method as in claim 10, wherein the spacer particles are friable.

13. A method as in claim 10, wherein the spacer particles comprise at least one of an abrasive particle, an abrasive agglomerate and a grinding aid.

14. A method as in claim 10, wherein the spacer particles are at least one of square and trapezoidal in shape.

15. A method as in claim 14, wherein the spacer particles have sloped sidewalls.

16. A method as in claim 10, wherein the spacer particles are spherical in shape.

17. A method as in claim 16, wherein the spacer particles are glass spheres or glass bubbles.

18. A method as in claim 10, wherein the spacer particles are made of a material selected to withstand a crushing force between the production tool and the resin coated backing sheet at the deposit point.

19. A method as in claim 10, wherein the spacer particles are made of a material that melts or evaporates at elevated temperatures above ambient room temperature.

* * * * *